(12) United States Patent
Suzuki

(10) Patent No.: US 8,810,856 B2
(45) Date of Patent: Aug. 19, 2014

(54) IMAGE PROCESSING DEVICE EXECUTING HALFTONE PROCESS BY USING DETERMINED PARAMETER BASED ON POTENTIAL FOR BANDING

(71) Applicant: Brother Kogyo Kabushiki Kaisha, Nagoya (JP)

(72) Inventor: Yukinori Suzuki, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 51 days.

(21) Appl. No.: 13/762,256

(22) Filed: Feb. 7, 2013

(65) Prior Publication Data

US 2013/0208321 A1 Aug. 15, 2013

(30) Foreign Application Priority Data

Feb. 10, 2012 (JP) ................................. 2012-027166

(51) Int. Cl.
  *H04N 1/405* (2006.01)
  *H04N 1/409* (2006.01)
  *G06K 15/02* (2006.01)
(52) U.S. Cl.
  CPC ............ *G06K 15/1881* (2013.01); *H04N 1/409* (2013.01); *H04N 1/4057* (2013.01)
  USPC ......... 358/2.1; 358/3.05; 358/3.06; 358/3.12; 358/3.26

(58) Field of Classification Search
  None
  See application file for complete search history.

(56) References Cited

U.S. PATENT DOCUMENTS

2006/0071955 A1 4/2006 Arazaki
2007/0002348 A1 1/2007 Hagiwara
2009/0244575 A1* 10/2009 Sasayama ...................... 358/1.9

FOREIGN PATENT DOCUMENTS

| JP | 2005-205685 A | 8/2005 |
| JP | 2006-130904 A | 5/2006 |
| JP | 2006-247918 A | 9/2006 |
| JP | 2006-256299 A | 9/2006 |

* cited by examiner

*Primary Examiner* — Scott A Rogers
(74) *Attorney, Agent, or Firm* — Merchant & Gould PC

(57) ABSTRACT

In an image processing device, a processor is configured to perform: (a) acquiring target image data representing an image including a plurality of pixels, where the target image data includes a plurality of sets of pixel data corresponding to the plurality of pixels, where the image includes an object having at least one pixel of the plurality of pixels; (b) detecting the object in the image based on the target image data; (c) determining characteristic data indicating a potential for an occurrence of banding in the object based on the target image data; (d) determining a parameter based on the characteristic data; and (e) executing a halftone process to determine, for each of the plurality of pixels, a dot to be found based on the corresponding set of pixel data by using the parameter.

10 Claims, 15 Drawing Sheets

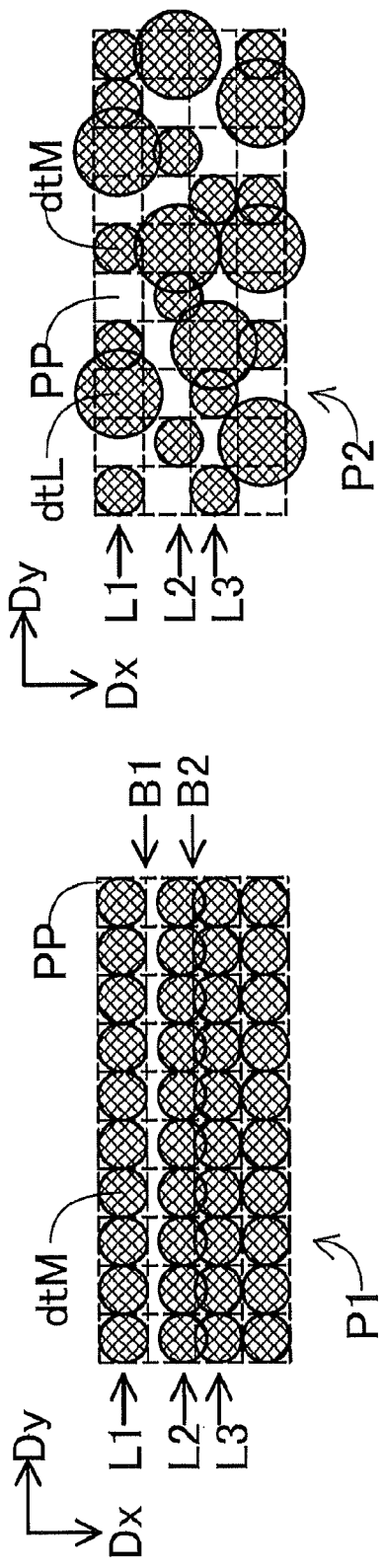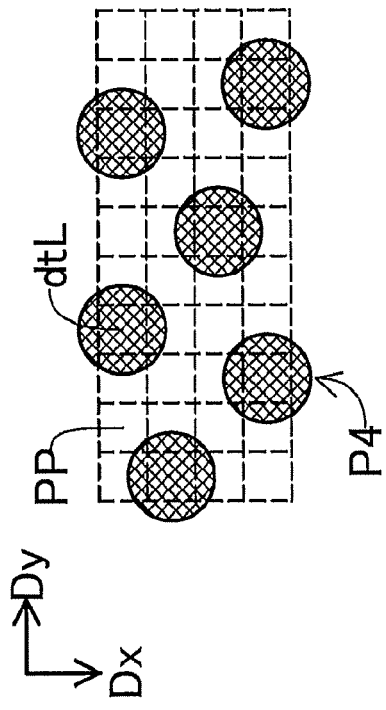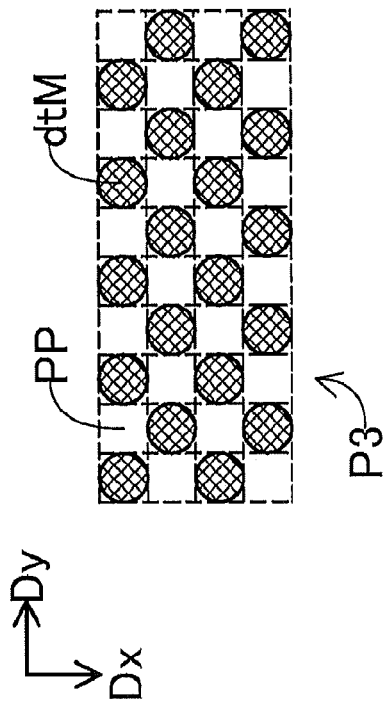

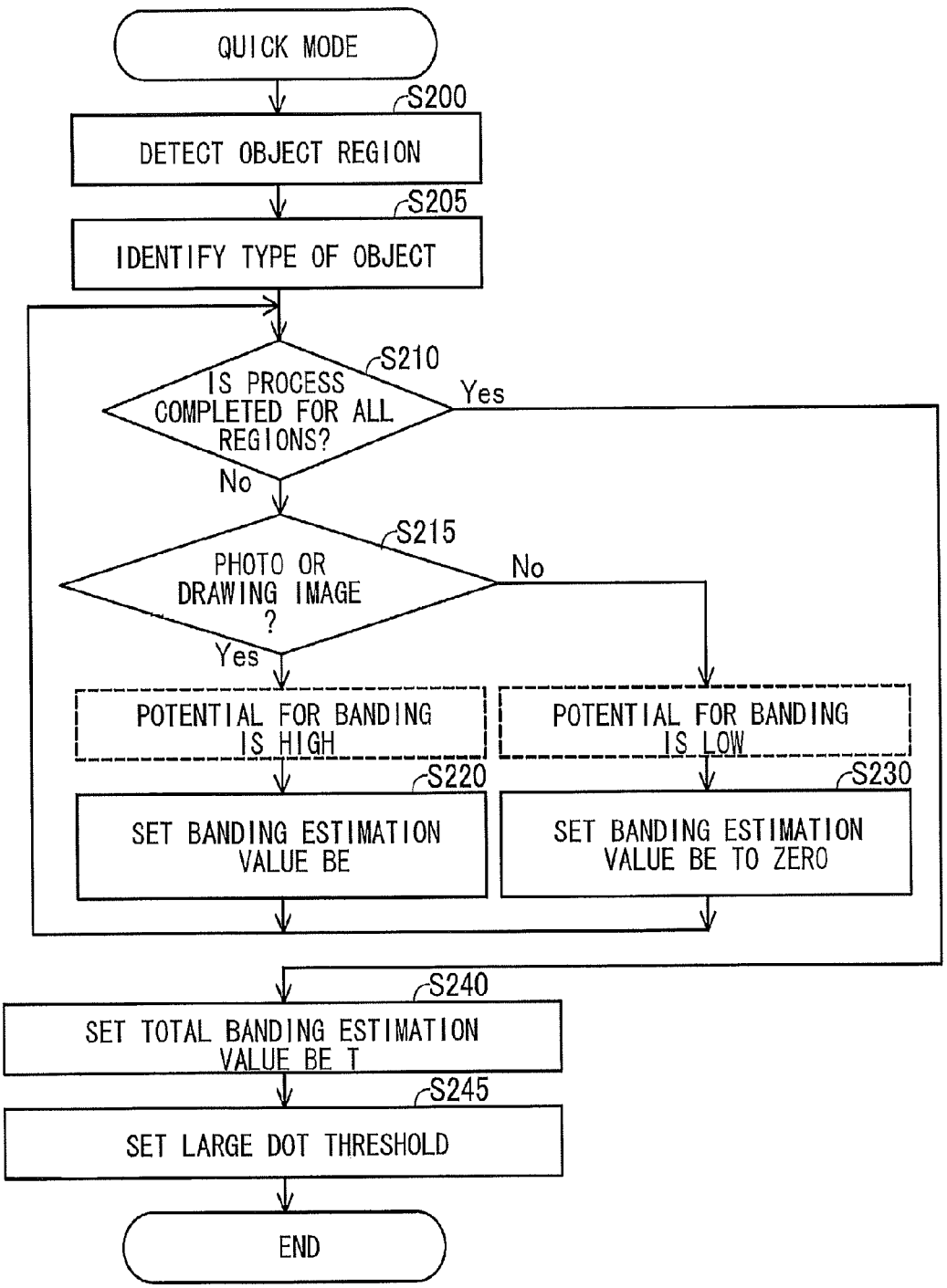

FIG. 7A

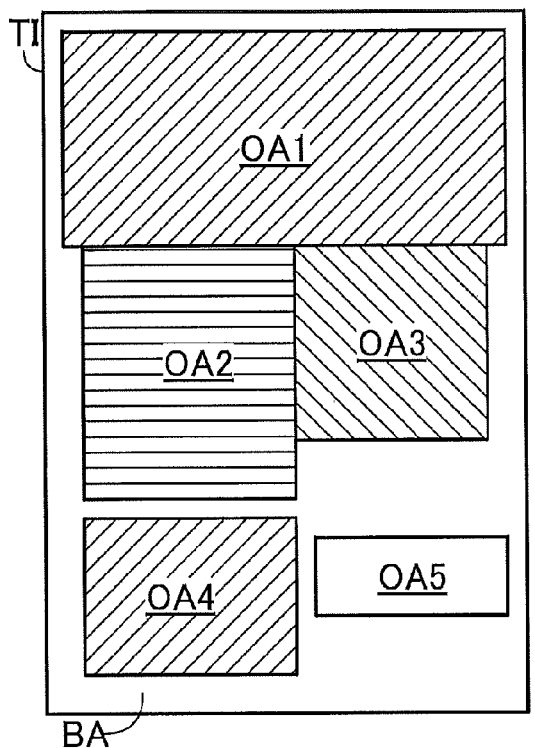

FIG. 7(B)

| DISTRIBUTION WIDTH W | COLOR NUMBER C | PIXEL DENSITY D | TYPE |
|---|---|---|---|
| GREATER THAN OR EQUAL TO Wth | GREATER THAN OR EQUAL TO Cth | GREATER THAN OR EQUAL TO Sth | PHOTO IMAGE |
| | | SMALLER THAN Sth | PHOTO IMAGE |
| | SMALLER THAN Cth | GREATER THAN OR EQUAL TO Sth | DRAWING IMAGE |
| | | SMALLER THAN Sth | TEXT IMAGE |
| SMALLER THAN Wth | GREATER THAN OR EQUAL TO Cth | GREATER THAN OR EQUAL TO Sth | PHOTO IMAGE |
| | | SMALLER THAN Sth | TEXT IMAGE |
| | SMALLER THAN Cth | GREATER THAN OR EQUAL TO Sth | DRAWING IMAGE |
| | | SMALLER THAN Sth | TEXT IMAGE |

FIG. 8
| REGION NUMBER | BANDING ESTIMATION VALUE | SIZE |
|---|---|---|
| 1 | BE1 | S1 |
| 2 | BE2 | S2 |
| 3 | BE3 | S3 |
| ⋮ | ⋮ | ⋮ |
| n | BEn | Sn |
$$BE\_T = \frac{\Sigma(BEk \times Sk)}{\Sigma Sk}$$
FIG. 9
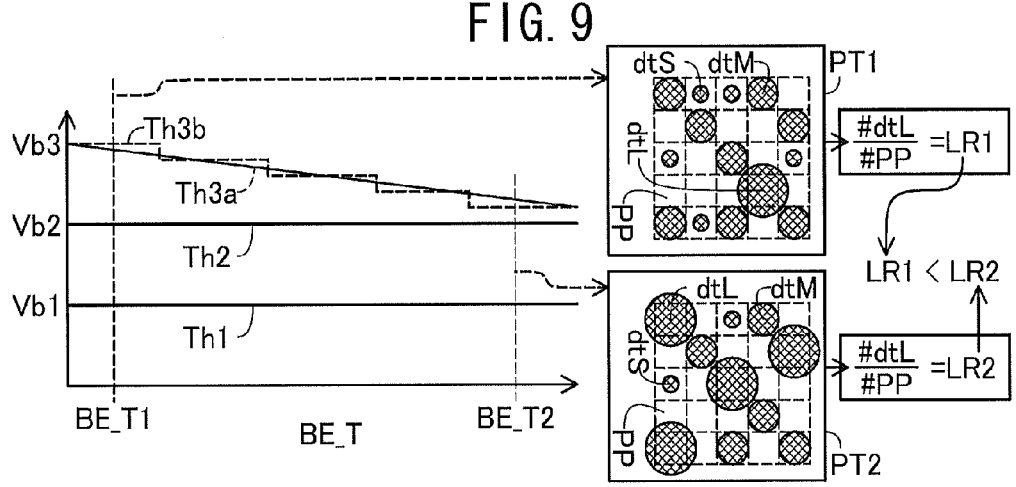
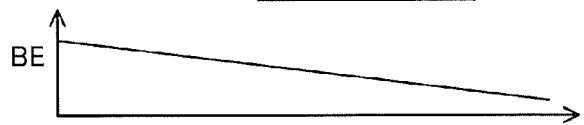
FIG. 10 (A)
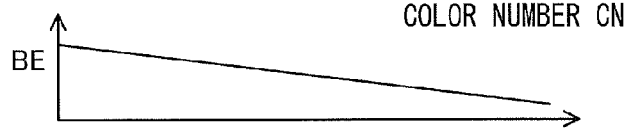
FIG. 10 (B)
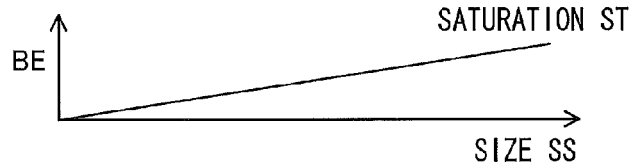
FIG. 10 (C)

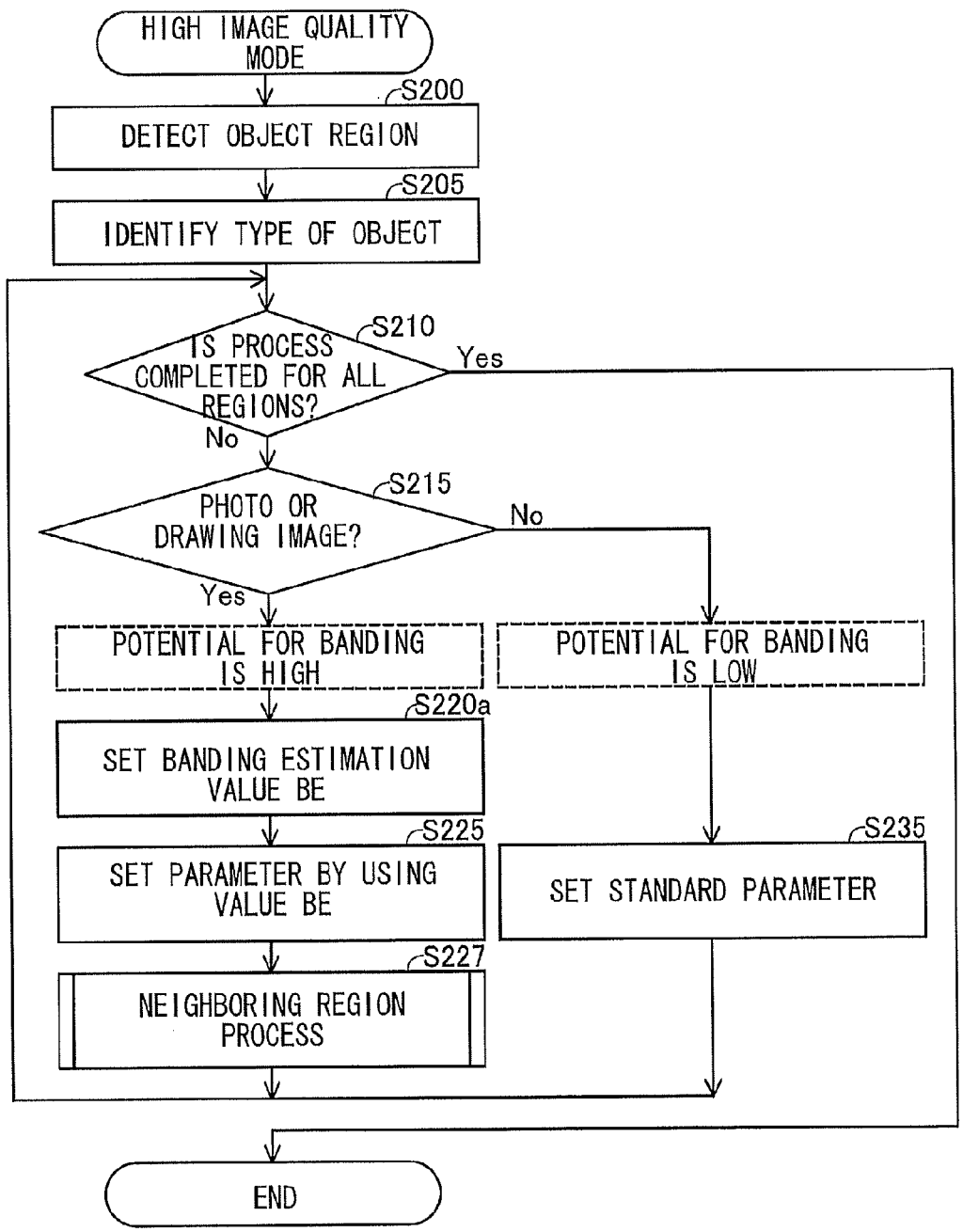

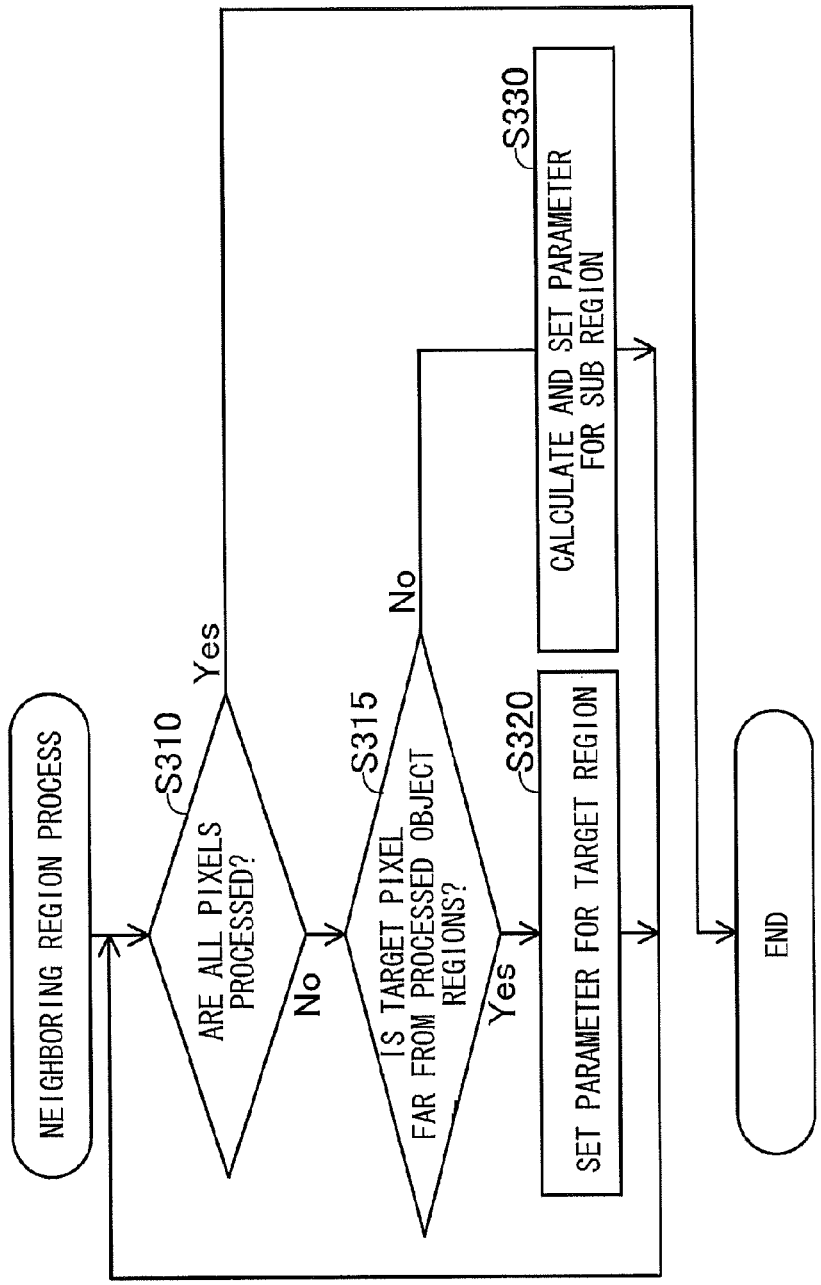

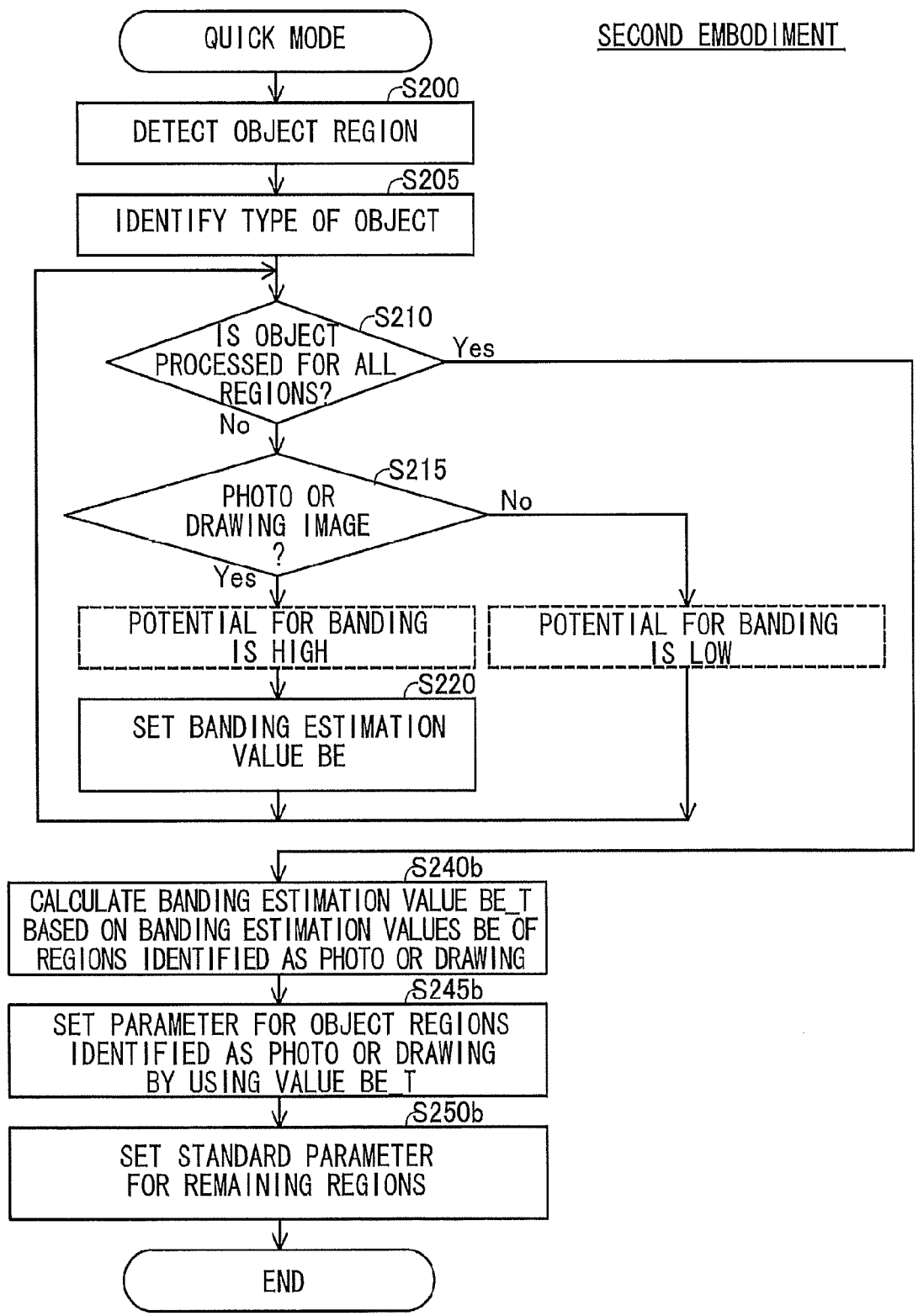

IMAGE PROCESSING DEVICE EXECUTING HALFTONE PROCESS BY USING DETERMINED PARAMETER BASED ON POTENTIAL FOR BANDING

CROSS REFERENCE TO RELATED APPLICATION

This application claims priority from Japanese Patent Application No. 2012-027166 filed Feb. 10, 2012. The entire content of the priority application is incorporated herein by reference.

TECHNICAL FIELD

The present invention relates to an image processing device for suppressing banding in a printed image.

BACKGROUND

Printing devices that print images by forming dots on a recording medium with ink, toner, or other colorant are in widespread use. Various technologies have been proposed for such printing devices designed to improve the quality of the printed image. For example, technologies have been proposed to increase the size of dots formed on the printing medium in order to reduce unintentional streak-like patterns called "banding" in the printed image.

SUMMARY

However, comprehensive improvements in image quality are never easy, and processes designed to suppress banding have the potential to produce other problems related to image quality. For example, increasing dot size excessively to suppress banding often has the undesirable effect of worsening the graininess quality of the image.

In order to attain the above and other objects, the invention provides an image processing device including a processor. The processor is configured to perform: (a) acquiring target image data representing an image including a plurality of pixels, the target image data including a plurality of sets of pixel data corresponding to the plurality of pixels, the image including an object having at least one pixel of the plurality of pixels; (b) detecting the object in the image based on the target image data; (c) determining characteristic data indicating a potential for an occurrence of banding in the object based on the target image data; (d) determining a parameter based on the characteristic data; and (e) executing a halftone process to determine, for each of the plurality of pixels, a dot to be formed based on the corresponding set of pixel data by using the parameter.

According to another aspect, the present invention provides a non-transitory computer-readable storage medium storing computer-readable instructions that, when executed by a processor, causes an image processing device to perform: (a) acquiring target image data representing an image including a plurality of pixels, the target image data including a plurality of sets of pixel data corresponding to the plurality of pixels, the image including an object having at least one pixel of the plurality of pixels; (b) detecting the object in the image based on the target image data; (c) determining characteristic data indicating a potential for an occurrence of banding in the object based on the target image data; (d) determining a parameter based on the characteristic data; and (e) executing a halftone process to determine, for each of the plurality of pixels, a dot to be formed based on the corresponding set of pixel data by using the parameter.

BRIEF DESCRIPTION OF THE DRAWINGS

The particular features and advantages of the invention as well as other objects will become apparent from the following description taken in connection with the accompanying drawings, in which:

FIGS. 4(A)-4(D) are explanatory diagrams showing an effect of dot size on banding and graininess;

FIG. 6 is a flowchart illustrating steps in a quick mode process corresponding to S140 of FIG. 5;

FIGS. 7(A)-7(C) are explanatory diagrams for explaining object regions;

FIG. 8 is an explanatory diagram showing a sample calculation of a total banding estimation value BE_T;

FIG. 9 includes a graph illustrating a relationship between the total banding estimation value BE_T and thresholds Th1, Th2, and Th3, and schematic diagrams of sample dot patterns;

FIGS. 10(A)-10(C) include graphs showing separate examples of the banding estimation value BE;

FIG. 11 is a flowchart illustrating steps in a high image quality mode process in S20 of FIG. 5;

FIG. 15 is a flowchart illustrating steps in a quick mode process according to a second embodiment.

DETAILED DESCRIPTION

A. First Embodiment

Figure 1:
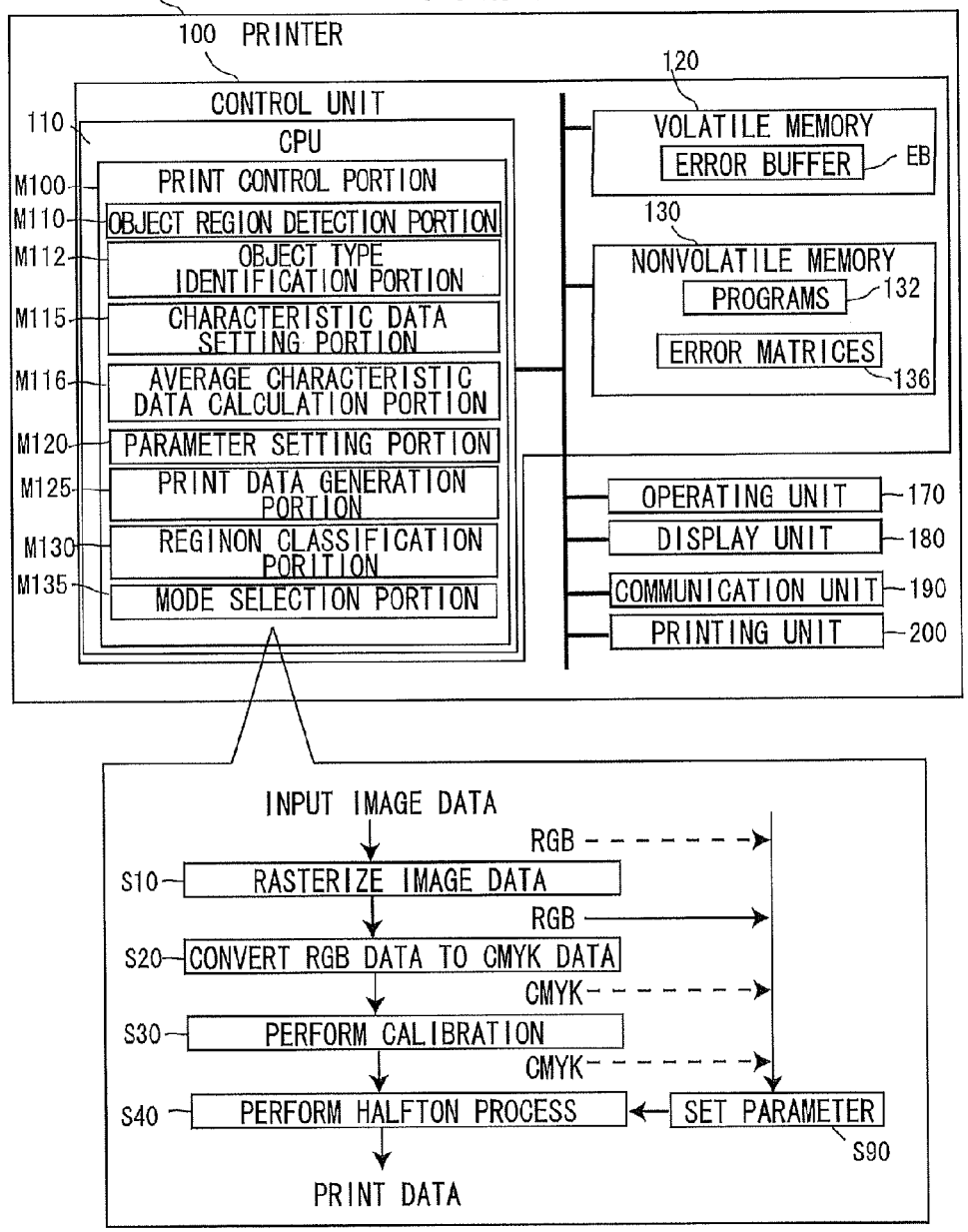
FIG. 1 is a block diagram of a printer according to an embodiment.

FIG. 1 is a block diagram of a printer 900 according to an embodiment of the present invention. The printer 900 includes a control portion 100, an operating unit 170 configured of a touchscreen, a display unit 180 configured of a liquid crystal display, a communication unit 190 serving as an interface for communications with external devices, and a printing unit 200.

In the embodiment, the printing unit 200 forms dots on a printing medium by ejecting ink droplets toward the medium. The resulting printed image is rendered by patterns of dots. The printing unit 200 employs ink in the colors cyan, magenta, yellow, and black.

The communication unit 190 has an interface conforming to the USB or IEEE 802.3 standard, for example.

In the embodiment, the control portion 100 is a computer that includes a CPU 110, a volatile memory 120, and a non-volatile memory 130.

The volatile memory 120 is configured of DRAM or the like and includes an error buffer EB used in a halftone process described later.

The nonvolatile memory 130 is configured of EEPROM or the like and serves to store programs 132, and error matrices 136.

The CPU 110 executes the programs 132 to implement various functions, including the functions of a print control unit M100. The print control unit M100 generates print data using target image data (hereinafter referred to as "input image data") and controls the printing unit 200 to print an image based on the generated print data by supplying the print data to the printing unit 200. The input image data may be data supplied to the printer 900 via the communication unit 190 from an external device, such as a computer (not shown). In the embodiment, the print control unit M100 also includes an object region detection portion M110, an object type identification portion M112, a characteristic data setting portion M115, an average characteristic data calculation portion M116, a parameter setting portion M120, a print data generation portion M125, a region classification portion M130, and a mode selection portion M135.

The print data generation portion M125 functions to generate print data from the input image data. The bottom portion of FIG. 1 shows an example of such a process to generate print data. In S10 of the print data generation process, the print data generation portion M125 converts the input image data to bitmap data. The bitmap is pixel data representing pixel colors for the three components red, green, and blue in 256 levels of gradation values, for example. The pixel density of the bitmap data is identical to the resolution of the print data. The resolution of print data indicates the density of pixels (called "print pixels") representing the smallest unit that expresses the formation state of dots on the printing medium.

In S20 the print data generation portion M125 converts the RGB pixel data included in the bitmap data to ink gradation data representing the colors of pixels in gradation values for the color components of ink used by the printing unit 200 (color conversion process). In the embodiment, the ink gradation data is CMYK pixel data representing the colors of pixels in gradation values (one of 256 levels, for example) for each of the four color components cyan, magenta, yellow, and black. The color conversion process is performed using a color profile (a look-up table, for example) correlating RGB pixel data with CMYK pixel data.

In S30 the print data generation portion M125 corrects the value of each color component in the CMYK pixel data so that the actual densities of colors printed on the printing medium change linearly in response to changes in the gradation values (calibration process). Calibration is performed using a one-dimensional look-up table associating original gradation values with calibrated gradation values. A look-up table is provided for each of the CMYK color components.

In S40 the print data generation portion M125 converts the bitmap data included in the calibrated CMYK pixel data to pattern data expressing a pattern of the dot formation state for each print pixel (halftone process). In the halftone process, the print data generation portion M125 converts the gradation values of print pixels to gradation values (hereinafter called the "dot formation state") among a number of levels smaller than the number of levels of the original gradation values (256 levels in this example), In the embodiment, the dot formation states are set to one of the following four ink quantities, i.e., dot sizes; a "large dot," "medium dot" (where size of medium dot<size of large dot), "small dot" (where size of small dot<size of medium dot), and "no dot."

In the embodiment, the print data generation portion M125 generates pattern data according to an error diffusion method. The print data generation portion M125 converts the pattern data generated in this process to data in a format that the printing unit 200 can interpret (print data). The print data generation portion M125 supplies the print data to the printing unit 200. Note that the parameters used in step S40 are set in S90. The process of setting parameters will be described later.

Figure 2:
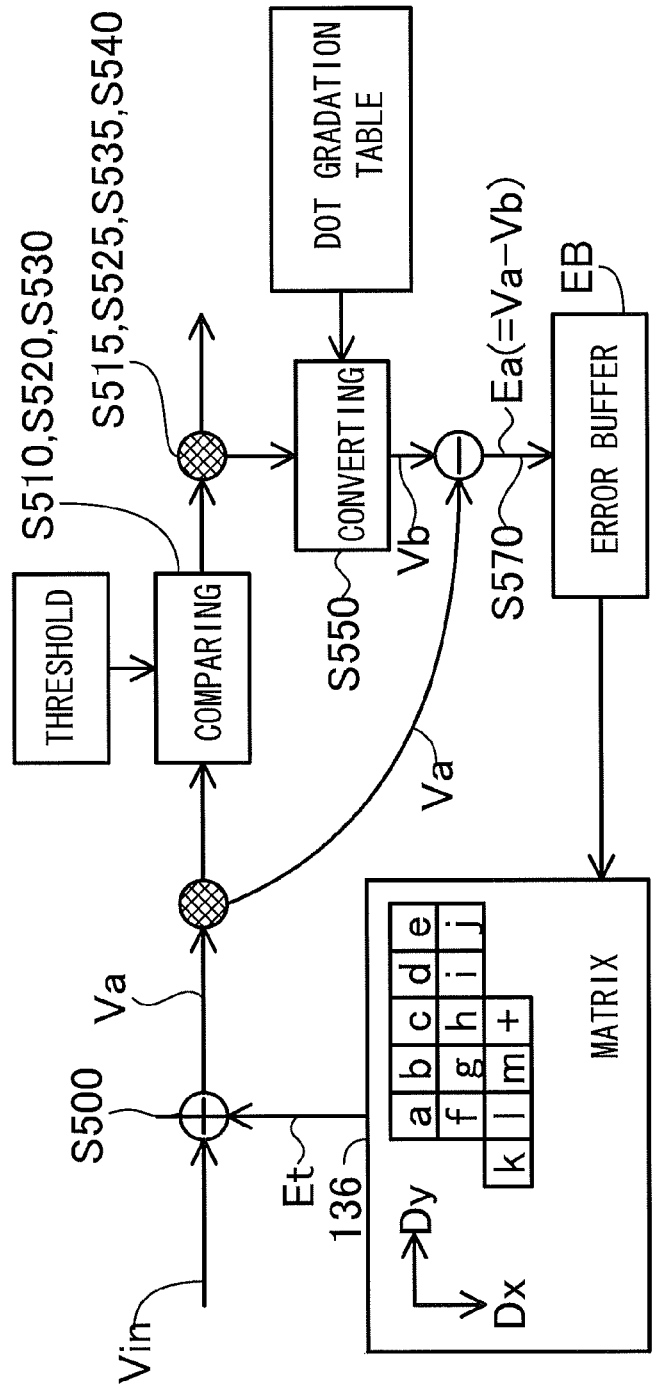
FIG. 2 is an explanatory diagram schematically showing a halftone process.
Figure 3:
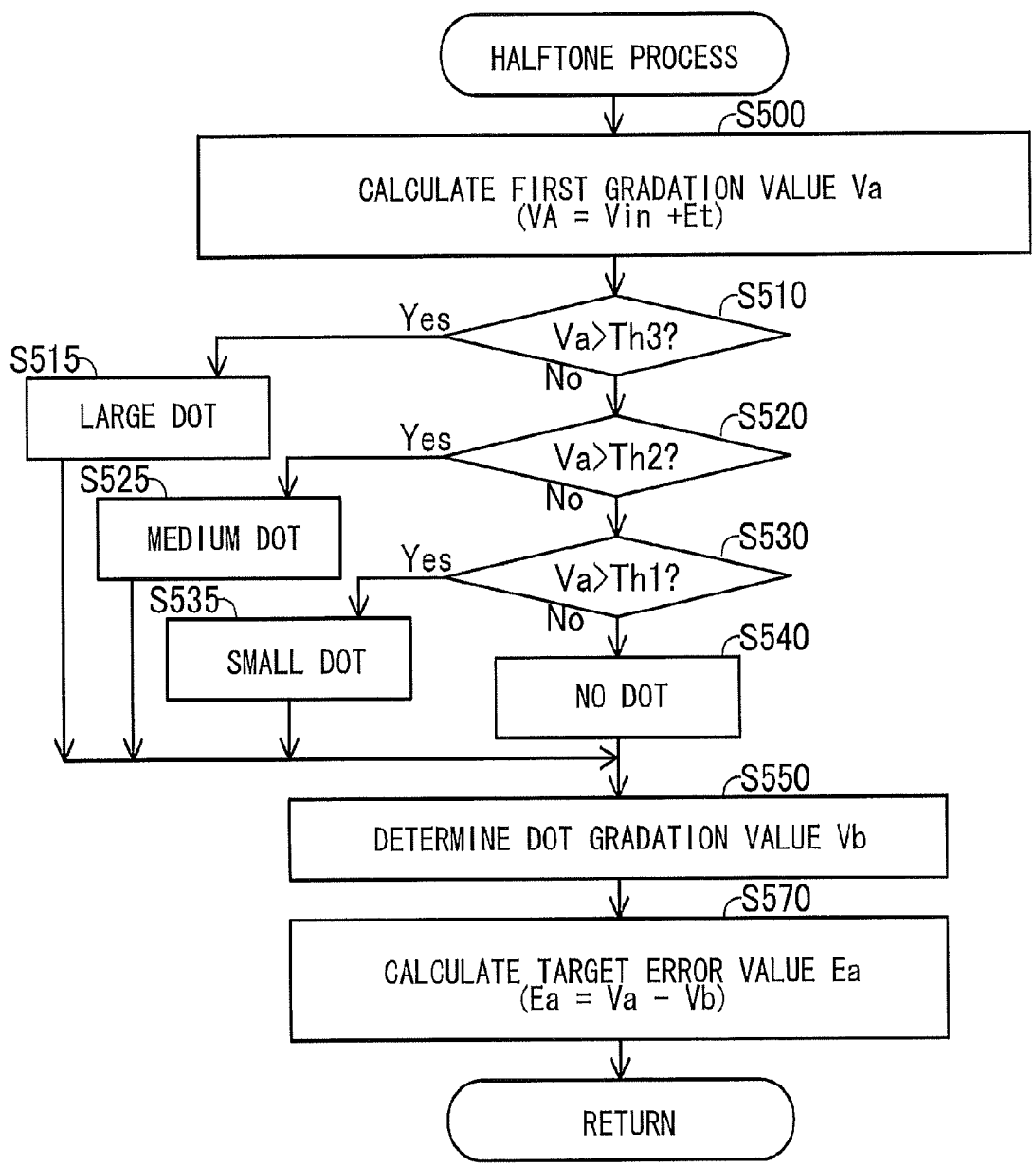
FIG. 3 is a flowchart illustrating steps in the halftone process.

FIG. 2 is an explanatory diagram showing schematically the halftone process. FIG. 3 is a flowchart illustrating steps in the halftone process. Next, steps in the halftone process of FIG. 3 will be described.

In S500 of FIG. 3, the print data generation portion M125 (see FIG. 1) calculates an error value Et for the print pixel being subjected to this process (hereinafter referred to as the "target pixel") using the error matrices 136 and the error buffer EB. As will be described later, the error buffer EB is provided in the volatile memory 120 and stores a density error (gradation error value) for each pixel. The error matrices 136 assigns a weight greater than 0 to each pixel positioned within a prescribed relative distance from the target pixel. In the error matrices 136 of FIG. 2, the "+" symbol represents the target pixel, and weights a-m have been assigned to prescribed peripheral pixels. The values of the weights a-m total "1". Based on these weights, the print data generation portion M125 calculates the error value Et of the target pixel to be the weighted sum of error values for the peripheral pixels. Next, the print data generation portion M125 calculates a first gradation value Va to be the sum of the error value Et and a gradation value of the target pixel (hereinafter called the "input gradation value Vin"; the gradation value of cyan, for example).

In the subsequent process of S510-S540, the print data generation portion M125 sets the dot formation state of the target pixel based on the relative magnitude of the first gradation value Va to three thresholds Th1, Th2, and Th3. Here, Th1 is smaller than or equal to Th2, and Th2 is smaller than or equal to Th1. In the embodiment, the input gradation value Vin is one of 256 levels, from 0 to 255. The small dot threshold Th1 is the threshold for outputting a small dot (a value of "0", for example). The medium dot threshold Th2 is the threshold for outputting a medium dot (a value of "84", for example). The large dot threshold Th3 is the threshold for outputting a large dot. As will be described later, the large dot threshold Th3 is a variable value set by the parameter setting portion M120.

The print data generation portion M125 sets the dot formation state as follows.
A) When first gradation value Va>large dot threshold Th3 (S510: YES), dot formation state="large dot" (S515)
B) When first gradation value Va≤large dot threshold Th3 and first gradation value Va>medium dot threshold Th2 (S520: YES), dot formation state="medium dot" (S525)
C) When first gradation value Va≤medium dot threshold Th2 and first gradation value Va>small dot threshold Th1 (S530: YES), dot formation state="small dot" (S535)
D) When first gradation value Va≤small dot threshold Th1 (S530: NO), dot formation state="no dot" (S540)

In S550 following the determination of the dot formation state, the print data generation portion M125 acquires the gradation value associated with this dot formation state (hereinafter called the "dot gradation value Vb"). In the embodiment, the dot gradation value is set as follows.
A) Large dot: dot gradation value Vb=255
B) Medium dot: dot gradation value Vb=170
C) Small dot: dot gradation value Vb=84
D) No dot: dot gradation value Vb=0

The dot gradation value Vb indicates the density represented by the dot formation state. The above correlations are integrated in the print data generation portion M125 as a dot gradation table.

In S570 the print data generation portion M125 calculates a target error value Ea according to the following equation.

Target error value $Ea$=first gradation value $Va$–dot gradation value $Vb$

The print data generation portion M125 records the target error value Ea calculated according to the above equation in the error buffer EB as the error value for the target pixel.

The print data generation portion M125 sets the dot formation state of each print pixel according to the method described above for each of the CMYK colors.

FIGS. 4(A)-4(D) are explanatory diagrams showing the effect of dot size on banding and graininess. FIGS. 4(A) and 4(B) show a plurality of print pixels PP included in three pixel lines L1, L2, and L3 extending in a second direction Dy. The three pixel lines L1, L2, and L3 are juxtaposed in the order given in a first direction Dx orthogonal to the second direction Dy. FIG. 4(A) shows a first pattern P1 in which a medium dot dtM is formed for each print pixel PP. FIG. 4(B) shows a second pattern P2 including a mixture of medium dots dtM, large dots dtL, and no dots for the print pixels PP. These patterns P1 and P2 render uniform regions of the same gradation.

FIGS. 4(A) and 4(B) show examples in which the dots formed in the second pixel line L2 are offset in the first direction Dx. This dot offset can be produced by a variety of factors, including error in conveying the printing medium and manufacturing error in the nozzles that eject the ink droplets.

FIG. 4(A) shows two lines B1 and B2 caused by the positional offset of dots in the second pixel line L2. The light line B1 is produced from the unintended gap increase between the medium dots dtM in the first pixel line L1 and the medium dots dtM in the second pixel line L2. The dark line B2 is produced due to the unintended overlap of the medium dots dtM in the second pixel line L2 with the medium dots dtM in the third pixel line L3. The light line B1 or the dark line B2 in this case is an example of banding.

This type of banding tends to occur when a large number of dots are formed at a size equivalent to the size of the print pixels PP (i.e., dots that are not so large as to protrude outside of the print pixel PP when there is no offset). More specifically, dots that tend to produce banding are not so large that they overlap dots of the same size in neighboring print pixels PP when there is no offset, but are sufficiently large to overlap dots of the same size in neighboring print pixels PP when there is offset. The size of the medium dots dtM in the embodiment corresponds to the size that produces this type of banding. Hence, banding can occur when the density of medium dots dtM (number of medium dots dtM per unit area) is large.

As in the example of FIG. 4(A), dots formed in the second pixel line L2 in FIG. 4(B) are also offset in the first direction Dx. However, banding in the form of a light line or a dark line is not produced in this case, as can be seen in the drawing, because the second pattern P2 includes large dots dtL. As shown in FIG. 4(B), a large dot dtL can cover a single print pixel PP entirely and is of sufficient size to protrude outside the print pixel PP when there is no offset. Accordingly, large dots dtL can overlap dots in neighboring print pixels PP (including medium dots dtM or large dots dtL), whether there is dot offset or not. Thus, regardless of whether there is a positional offset, this pattern can reduce the occurrence of unintended gaps (the light line B1, for example) and unintended dot overlap (the dark line B2, for example). The potential for banding drops as the density of the large dots dtL increases.

FIG. 4(C) shows a third pattern P3 in which medium dots dtM are formed in some of the print pixels PP. FIG. 4(D) shows a fourth pattern P4 in which large dots dtL are formed in some of the print pixels PP. These patterns P3 and P4 render a uniform region of the same gradation.

Dots in the third pattern P3 of FIG. 4(C) are smaller in size and larger in number (higher in density of dots) than dots in the fourth pattern P4 of FIG. 4(D). Accordingly, the third pattern P3 can achieve better graininess than the fourth pattern P4.

As described above, the potential for banding drops as the density of large dots dtL increases. Conversely, graininess can be improved by reducing the density of large dots dtL and increasing the density of smaller dots (medium dots dtM, for example). While the sample patterns shown in FIGS. 4(A)-4(D) include no small dots, the same results are obtained with patterns that include small dots.

Figure 5:
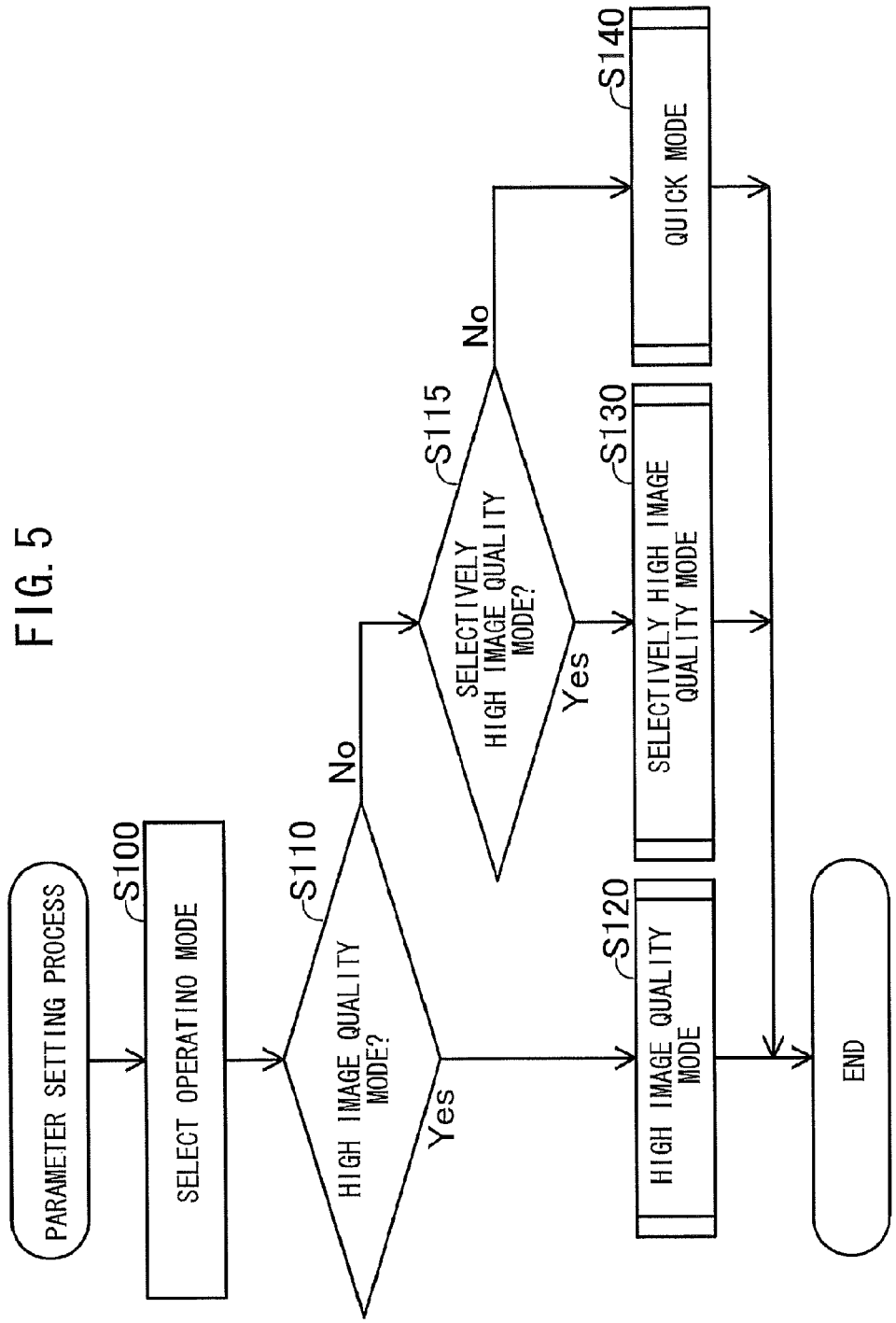
FIG. 5 is a flowchart illustrating steps in a parameter setting process corresponding to S90 of FIG. 1.

FIG. 5 is a flowchart illustrating steps in a parameter setting process corresponding to S90 of FIG. 1. In the embodiment, the mode selection portion M135 (see FIG. 1) executes the parameter setting process to set the large dot threshold Th3 used as a parameter for large dots in the halftone process. This parameter setting process is performed for each set of the input image data.

In S100 at the beginning of the parameter setting process, the mode selection portion M135 selects an operating mode according to a user instruction. There are three possible operating modes in the embodiment for the parameter setting process and print data generation process: high image quality mode, selective high image quality mode, and quick mode. The user can input an instruction specifying the desired operating mode through operations on the operating unit 170. The mode selection portion M135 selects the operating mode based on the inputted instruction. If the inputted instruction indicates the high image quality mode (S110: YES), in S120 the mode selection portion M135 executes a high image quality mode process shown in FIG. 11. If the inputted instruction indicates the selective high image quality mode (S110: NO, S115: YES), in S130 the mode selection portion M135 executes a selective high image quality mode process shown in FIG. 13. If the inputted instruction indicates the quick mode (S110: N0, S115: NO), in S140 the mode selection portion M135 executes a quick mode process shown in FIG. 6, A1. Quick Mode FIG. 6 is a flowchart illustrating steps in the quick mode process (S140 of FIG. 5). In S200 of FIG. 6, the object region detection portion M110 (see FIG. 1) analyzes the target image data to be printed in order to detect object regions representing objects. In the embodiment, the bitmap data generated in S10 of FIG. 1 is used as the target image data.

Figure 7C:
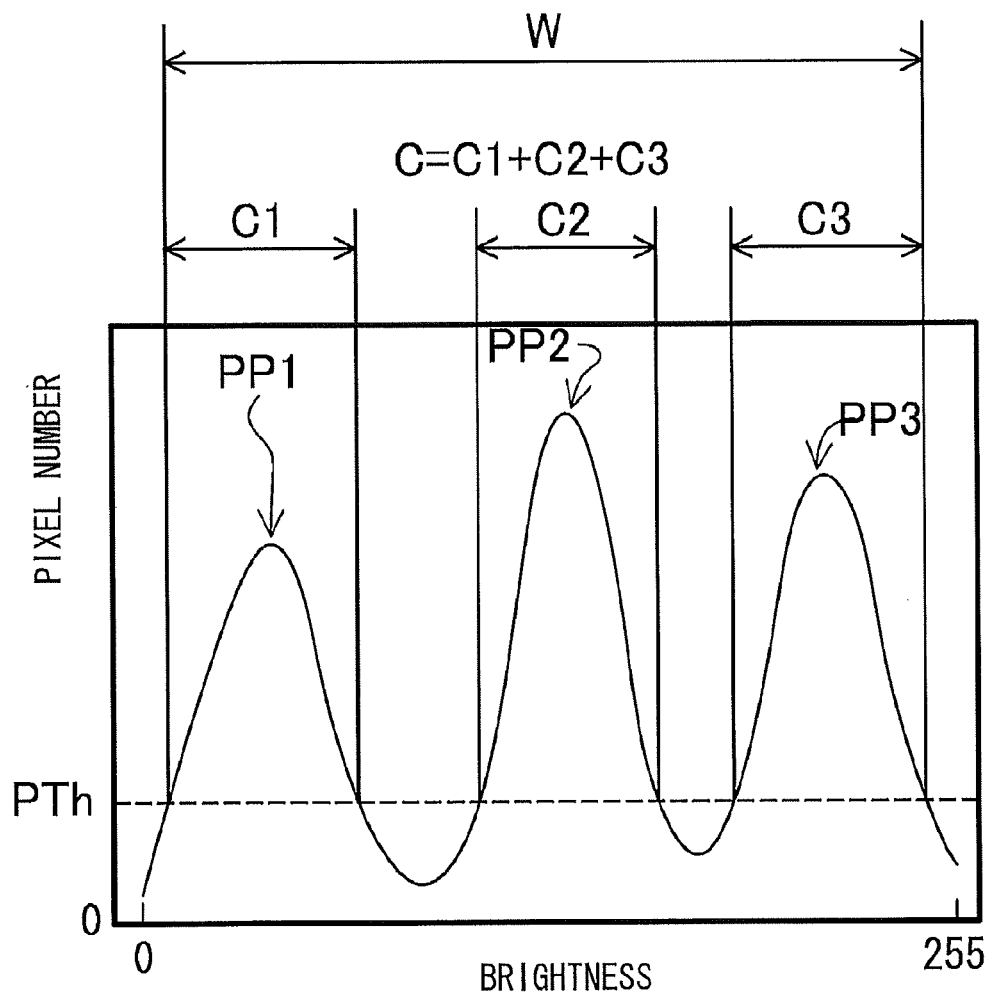

FIGS. 7(A)-7(C) are explanatory diagrams for describing object regions. FIG. 7(A) shows a target image TI represented by the target image data. The target image TI of FIG. 7(A) includes five object regions OA1-OA5. Objects differ from the background and may include text, photographs, illustrations, graphs, and other output.

In the embodiment, the object region detection portion M110 treats the regions of the target image TI remaining after eliminating a background region BA as object regions. The object region detection portion M110 identifies each rectangular region surrounded by the background region BA as a single object region. The fourth and fifth object regions OA4 and OA5 in FIG. 7(A) are examples of such object regions.

When the shape of a continuous region surrounded by the background region BA differs from a rectangle, the object region detection portion M110 breaks the region down into a plurality of rectangular regions and identifies each rectangular region as an object region. The first, second, and third object regions OA1, OA2, and OA3 in FIG. 7(A) are examples of such regions. The background region BA may be identified according to any of various methods. For example, the object region detection portion M110 may identify the background region BA to be a region of continuous pixels having a prescribed color (white, for example) that includes the edges of the target image TI. Instead of the prescribed color, the color of the background region BA may be assumed to be the color of the edge portions of the target image TI.

In S205 of FIG. 6, the object type identification portion M112 (see FIG. 1) identifies the type of object in each object region. Object regions in the embodiment can have one of the types "text image," "photo image," and "drawing image." A text image represents characters. A photo image is an image captured through photography or the like. A drawing image is a drawn image, such as an illustration or graph.

The table in FIG. 7(B) shows conditions for identifying object types. In the embodiment, the object type identification portion M112 identifies the type of an object according to a color distribution width W, a color number C, and a pixel density S.

The graph in FIG. 7(C) will be used to illustrate the color distribution width W and the color number C. FIG. 7(C) shows a brightness histogram indicating brightness values calculated from pixel values in a single object region, where brightness in the embodiment is expressed by an integer between 0 and 255. Pixels expressing substantially the same color as the background region BA have been omitted from this histogram. Specifically, pixels having colors that differ from the color of the background region BA no more than a prescribed value (for examples, pixels whose color component values differ from those of the background by no more than a prescribed threshold) are omitted from the histogram.

The color number C is the cumulative width of brightness for which the frequency (pixel count) exceeds a prescribed threshold PTh. The color number C can be calculated by multiplying the total number of intervals (referred to as "bins") in which the frequency exceeds the threshold PTh by the width of a single bin. The sample histogram in FIG. 7(C) indicates three peaks PP1, PP2, and PP3 that exceed the threshold PTh. The color number C in this case is the sum of the width C1 of brightness for the portion of the first peak PP1 that exceeds the threshold PTh, the width C2 of brightness for the portion of the second peak PP2 that exceeds the threshold PTh, and the width C3 of brightness for the portion of the third peak PP3 that exceeds the threshold PTh. Since characters are generally rendered with few colors, the color number C is smaller when the object region represents text. The color number C is larger when the object region represents a photographic image, since the photographed subjects are normally represented by a variety of colors. Drawing images are often rendered with more colors than text, but usually have fewer colors than photographic images. Hence, when the object region represents a drawing image, the color number C tends to be larger than the color number C for a text image, but smaller than the color number C for a photographic image.

The color distribution width W is the difference (width) between the minimum value and the maximum value of brightnesses for which the frequency (pixel count) exceeds the threshold PTh. For the same reasons described above for the color number C, the color distribution width W is smaller when the object region represents text and larger when the object region represents a photograph. Similarly, when the object image represents a drawing, the color distribution width W tends to be larger than the color distribution width W for a text image and smaller than the color distribution width W for a photograph.

The pixel density S represents the density of pixels (i.e., the number of pixels per unit area) in the object region remaining after excluding those pixels that represent substantially the same color as the background. Pixels representing substantially the same color as the background are the same pixels excluded from the histogram. Normally, characters are written in fine lines on the background in a color that differs from the background. Accordingly, the pixel density S is smaller when the object region represents text. Most parts of a photographic image are rendered in colors that differ from the background. Consequently, the pixel density S is larger when the object region represents a photograph. As with text, drawing images are generally rendered on the background in colors different from the background. However, unlike text, drawing images are not limited to fine lines, but may include thicker lines and solid regions. Hence, when the object region represents a drawing image, the pixel density S tends to be larger than the pixel density S for a text image but smaller than the pixel density S for a photographic image.

The determination conditions in FIG. 7(B) take into account the above characteristics. Specifically, the object type identification portion M112 selects an object type associated with a combination of the following three determination results.

Determination 1) Is the color distribution width W greater than or equal to a prescribed distribution width threshold Wth?

Determination 2) Is the color number C greater than or equal to a prescribed color number threshold Cth?

Determination 3) Is the pixel density S greater than or equal to a prescribed pixel density threshold Sth?

For example, when the color distribution width W is less than the distribution width threshold Wth, the color number C is less than the color number threshold Cth, and the pixel density S is less than the pixel density threshold Sth, the object type identification portion M112 determines that the type of the object region is a "text image."

Therefore, in S205 of FIG. 6 the object type identification portion M112 generates a histogram similar to that shown in FIG. 7(C), calculates the color distribution width W and the color number C by analyzing the histogram, and calculates the pixel density S by analyzing the object regions. The object type identification portion M112 identifies the types of object regions using the color distribution width W, the color number C, and the pixel density S calculated above. The object type identification portion M112 identifies the type of each object region.

Next, the characteristic data setting portion M115 (see FIG. 1) sets a banding estimation value BE for each object region. The banding estimation value BE is a type of characteristic data (estimated value) representing the degree of potential for banding to occur in the printed image of the object region. In S210 the characteristic data setting portion M115 determines whether the above process for setting the banding estimation value BE has been completed for all object regions and advances to S215 while there remain unprocessed object regions (S210: NO), In S215 the characteristic data setting portion M115 selects one of the remaining unprocessed object regions as a target object region and determines whether the type of the target object region is "photo image" or "drawing image." If the target object image is of type "photo image" or "drawing image" (S215: YES), in S220 the characteristic data setting portion M115 sets the banding estimation value BE for the target object region to "1", If the type of the target object region is "text image" (S215: NO), in S230 the characteristic data setting portion M115 sets the banding estimation value BE for the target object region to "0".

Sometimes photographic images and drawing images include uniform regions with little change in color. For example, a photographic image may depict a blue sky without a single cloud, while a drawing image may include a graph having a single solid color. These types of substantially uniform regions are susceptible to banding. Text images, on the other hand, are generally rendered with fine lines and, hence, are less susceptible to banding. Accordingly, the characteristic data setting portion M115 in the embodiment sets the banding estimation value BE for photographic images and drawing images to a large value (1) and sets the banding estimation value BE for text images to a small value (0) smaller than the large value (1).

After setting the banding estimation value BE, the characteristic data setting portion M115 returns to S210. When the banding estimation value BE has been set for all object regions (S210: YES), the process shifts to S240.

In S240 the average characteristic data calculation portion M116 (see FIG. 1) sets a total banding estimation value BE_T. In the embodiment, the total banding estimation value BE_T is a weighted average of all banding estimation values BE obtained by weighted averaging the same. Here, each weight factor of the values BE is defined depending on the size of the object region corresponding to the value BE. FIG. 8 is an explanatory diagram showing a sample calculation of the total banding estimation value BE_T for n identified object regions (where n is an integer of 2 or greater). The value BEk indicates the banding estimation value BE for the $k^{th}$ object region (where k is a value between 1 and n, and the value Sk is the weight factor indicating the size of the $k^{th}$ object region. The number of pixels in the object region (corresponding to the area) may be employed as the size of the object region, for example. As shown in FIG. 8, the total banding estimation value BE_T is calculated by dividing the sum of the products of the value BEk and the value Sk by the sum of the values Sk, where the sum is a value related to all object regions. The total banding estimation value BE_T calculated in this manner represents the potential for banding to occur in printed results for the target image TI.

In S245 of FIG. 6 the parameter setting portion M120 (see FIG. 1) sets the large dot threshold Th3 for large dots using the total banding estimation value BE_T. FIG. 9 includes a graph illustrating the relationship between the total banding estimation value BE_T and the thresholds Th1, Th2, and Th3, and a schematic diagram of sample dot patterns. The horizontal axis in the graph of FIG. 9 represents the total banding estimation value BET, while the vertical axis represents the thresholds Th1, Th2, and Th3. A first pattern PT1 is an example of a dot pattern when the total banding estimation value BE_T is a first value BE_T 1. A second pattern PT2 is an example of a dot pattern when the total banding estimation value BE_T is a second value BE_T2 greater than the first value BE_T1.

In the embodiment, the parameter setting portion M120 sets the large dot threshold Th3 according to a first correlation Th3a. As shown in FIG. 9, in the line representing the first correlation Th3a, the large dot threshold Th3 continuously grows smaller as the total banding estimation value BE_T increases. When the large dot threshold Th3 is large, as in the first pattern PT1, small dots dtS and medium dots dtM are more likely to be formed than large dots dtL. A ratio LR1 of large dots dtL (=<number of large dots dtL>/<total number of print pixels PP>) in the first pattern PT1 is smaller than that in the second pattern PT2 described next. On the other hand, when the large dot threshold Th3 is small, as in the second pattern PT2, the large dots dtL are more likely to be formed, A ratio LR2 of large dots dtL in the second pattern PT2 is greater than the ratio LR1 of large dots dtL in the first pattern PT1.

Since the large dot threshold Th3 is small when the potential for banding is high (when the total banding estimation value BE_T is large), the number of large dots dtL per unit area (the ratio LR2 of large dots dtL in FIG. 9, for example) is increased. Thus, the potential for banding can be reduced, as described with reference to FIG. 4(B).

However, since the large dot threshold Th3 is large when the potential for banding is low (when the total banding estimation value BE_T is small), the number of large dots dtL per unit area (the ratio LR1 of large dots dtL in FIG. 9, for example) is reduced, while the total number of small dots dtS and medium dots dtM is increased. This results in improved graininess, as described with reference to FIG. 4(C). Further, despite the number of large dots dtL per unit area being reduced, banding can be suppressed since the total banding estimation value BE_T is small.

Note that the small dot threshold Th1 and the medium dot threshold Th2 are fixed and not dependent on the total banding estimation value BE_T. Specifically, the small dot threshold Th1 is identical to a dot gradation value Vb1 for small dots (84 in the embodiment), and the medium dot threshold Th2 is identical to a dot gradation value Vb2 for medium dots (170 in the embodiment). Further, the large dot threshold Th3 for the case in which the total banding estimation value BE_T is 0 is identical to a dot gradation value Vb3 for large dots (255 in the embodiment).

The quick mode process of FIG. 6 ends after the parameter setting portion M120 sets the large dot threshold Th3 as described above. The print data generation portion M125 executes the halftone process in S40 of FIG. 1 using the large dot threshold Th3 set by the parameter setting portion M120. In the embodiment, a common large dot threshold Th3 is applied to all types of object regions, but the common large dot threshold Th3 may also be applied to the background region BA.

As described above, the banding estimation value BE is set for each object region in the quick mode. Next, the large dot threshold Th3 is set according to the total banding estimation value BE_T calculated by weighted averaging the banding estimation values BE by the weight factors defined according to the size of the object regions. Accordingly, the control portion 100 can perform appropriate banding control. Further, the halftone process of the embodiment is performed using a common large dot threshold Th3 for all object regions, thereby simplifying the process.

Various correlations between the total banding estimation value BE_T and large dot threshold Th3 may be adopted, provided that the large dot threshold Th3 grows smaller as the total banding estimation value BE_T grows larger. For example, the large dot threshold Th3 may be changed in a plurality of steps as the total banding estimation value BE_T changes, as with a second correlation Th3b shown in FIG. 9.

Further, the banding estimation value BE set in S220 of FIG. 6 may be a variable value that changes according to the object region. FIGS. 10(A)-10(C) include graphs showing separate examples of the banding estimation value BE. In the example of FIG. 10(A), the characteristic data setting portion M115 reduces the banding estimation value BE as a color number CN grows larger, where the color number CN is the total number of colors used in the object region. The potential for an object region to include a uniform region is higher when the color number CN is lower. Since banding is more noticeable in uniform regions, the characteristic data setting portion M115 can set a banding estimation value BE that is suitable to the banding potential by reducing the banding estimation value BE for larger color numbers CN.

In the example of FIG. 10(B), the characteristic data setting portion M115 increases the banding estimation value BE as a saturation ST grows smaller. The saturation ST is the average saturation in the object region. Since density is lower when the saturation ST is lower, there is less potential for large dots being formed. Hence, the potential for banding is higher when the saturation ST is lower. The characteristic data setting portion M115 can set a banding estimation value BE that is suited to the banding potential by increasing the banding estimation value BE as the saturation ST decreases. Various statistics that reflect the saturation within the object region may be employed as the saturation ST. For example, the mean or mode of saturation within the object region may be employed as the saturation ST.

In the example of FIG. 10(C), the characteristic data setting portion M115 increases the banding estimation value BE as a size SS increases. The size SS represents the size of the printed image for the object region. Areas with unintended gaps and unintended dot overlap are greater when the size SS is greater. Hence, the potential for banding increases as the size SS increases. The characteristic data setting portion M115 can set a banding estimation value BE that is suitable for the banding potential by increasing the banding estimation value BE as the size SS increases. The total number of pixels in the object region (corresponding to the area of the object region) is employed as the size SS. However, the length of the longest side from one end to the other of the object region may also be employed as the size SS.

Note that the characteristic data setting portion M115 may set the banding estimation value BE using more than one type of data. For example, the characteristic data setting portion M115 may set the banding estimation value BE according to the color number CN and size SS. In this case, the banding estimation value BE is set smaller as the color number CN increases while the size SS remains the same, and larger as the size SS increases while the color number CN remains the same. However, the combination of data used to set the banding estimation value BE is not limited to this data but may be any combination selected from among the color number CN, the saturation ST, and the size SS.

Further, banding estimation values BE may be set for all object regions in S220, regardless of the type of object region.

A2. High Image Quality Mode

FIG. 11 is a flowchart illustrating steps in the high image quality mode process in S120 of FIG. 5. In the high image quality mode, the large dot threshold Th3 is set for each object region using the banding estimation value BE set for each object region. Steps in FIG. 11 that are identical to those in FIG. 6 are designated with the same step numbers. Thus, the processes performed in S200, S205, S210, and S215 in FIG. 11 are identical to the same steps described in FIG. 6. Unlike in the quick mode, the process for the high image quality mode in FIG. 11 ends at the same time all object regions have been processed (S210: YES).

If the type of the target object region is a "photo image" or a "drawing image" (S215: YES), in S220a the characteristic data setting portion M115 sets the banding estimation value BE for the target object region. In the high image quality mode, the characteristic data setting portion M115 varies the banding estimation value BE according to the type of object region, as illustrated in FIGS. 10(A)-10(C), In the embodiment, the characteristic data setting portion M115 sets the banding estimation value BE according to the color number CN (FIG. 10(A)).

In S225 the parameter setting portion M120 sets the large dot threshold Th3 to be applied to the target object region based on the banding estimation value BE. The parameter setting portion M120 sets the large dot threshold Th3 according to the correlation in FIG. 9 (using the banding estimation value BE in place of the total banding estimation value BE_T). That is, the large dot threshold Th3 is decreased as the banding estimation value BE increases.

Figure 12:
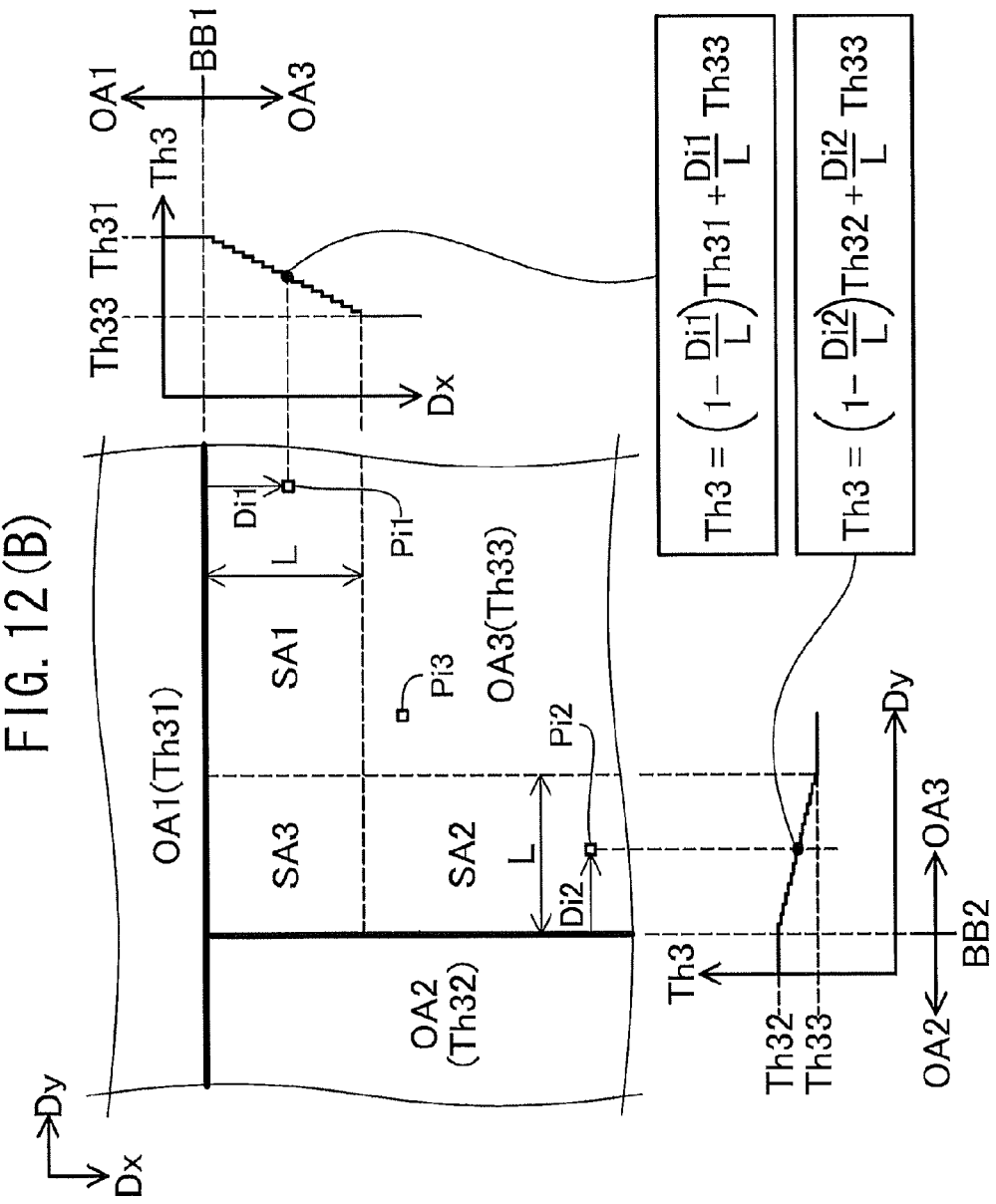
FIG. 12(A) is a flowchart illustrating steps in a neighboring region process in S227s of FIG. 11.
FIG. 12(B) is a schematic diagram illustrating the neighboring region process.

In S227 the parameter setting portion M120 performs a neighboring region process. FIG. 12(A) is a flowchart illustrating steps in the neighboring region process, and FIG. 12(B) is a schematic diagram illustrating the neighboring region process. The parameter setting portion M120 performs this process on each pixel in the target object region to set different parameters for pixels in areas neighboring object regions whose threshold Th3 have already been set (hereinafter called "processed object regions"). In S310 the parameter setting portion M120 determines whether all pixels in the target object region have been processed. If there remain unprocessed pixels (S310: NO), the parameter setting portion M120 advances to S315.

In S315 the parameter setting portion M120 selects one of the unprocessed pixels as a target pixel and determines whether the target pixel is far from the processed object regions adjacent to the target object region. In the embodiment, the parameter setting portion M120 determines that the target pixel is far from the processed object region neighboring the target object region when the shortest distance between the target pixel and the processed object region neighboring the target object region (hereinafter referred to as the "neighboring distance") is greater than a prescribed distance. The prescribed distance is L pixels (where L is an integer of 2 or greater) in the embodiment.

FIG. 12(B) shows object regions OA1, OA2, and OA3; target pixels Pi1, Pi2, and Pi3; neighboring distances Di1 and Di2; and sub-regions SA1, SA2, and SA3. The first and second object regions OA1 and OA2 are processed object regions, while the third object region OA3 is the target object region. The first object region OA1 is adjacent to the top edge of the third object region OA3 (the upstream edge in the first direction Dx). The second object region OA2 is adjacent to the left edge of the third object region OA3 (the upstream edge in the second direction Dy).

The first sub-region SA1, second sub-region SA2, and third sub-region SA3 are parts of the third object region OA3. The first sub-region SA1 is within the prescribed distance (L pixels) from the first object region OA1. The second sub-region SA2 is within the prescribed distance from the second object region OA2. The third sub-region SA3 is within the prescribed distance from both the first object region OA1 and the second object region OA2.

The first target pixel Pi1 is a pixel in the first sub-region SA1. The neighboring distance Di1 is the distance from the first object region OA1 to the first target pixel Pi1 and is the shortest distance from the first object region OA1 (a border BB1 between the object regions OA1 and OA3) to the first target pixel Pi1. The second target pixel Pi2 is a pixel in the second sub-region SA2. The neighboring distance Di2 is the distance to the second target pixel Pi2, and specifically the shortest distance from the second object region OA2 (a border BB2 between the object regions OA2 and OA3) to the second target pixel Pi2. The third target pixel Pi3 is a pixel positioned far from both the first object region OA1 and second object region OA2. That is, the third target pixel Pi3 is out of the regions SA1-SA3.

A first value Th31 is the large dot threshold determined as the value Th3 in previously executed S225 or S235 (described below) for the first object region OA1 A second value Th32 is the large dot threshold determined as the value Th3 in previously executed S225 or S235 (described below) for the second object region OA2. A third value Th33 is the large dot threshold determined in current S225 for the third object region OA3.

If the neighboring distance between the target pixel and a neighboring region is greater than the prescribed distance (L pixels; S315; YES), in S320 the parameter setting portion M120 sets the large dot threshold to be applied to the target pixel to the large dot threshold set in S225 of FIG. 11. For example, the large dot threshold for the third target pixel Pi3 of FIG. 12(B) is set to the large dot threshold determined in S225.

When the neighboring distance between the target pixel and a processed object region is within the prescribed distance (S315: NO), in S330 the parameter setting portion M120 calculates the large dot threshold to be applied to the target pixel so that the threshold varies from the large dot threshold for the neighboring processed object region to the large dot threshold for the target object region in proportion to the neighboring distance. The large dot threshold Th3 for the first target pixel Pi1 in FIG. 12(B) is calculated according to the following equation, for example.

$$Th3=(1-Di1/L) \times Th31+(Di1/L) \times Th33$$

Thus, the large dot threshold Th3 for a target pixel in the first sub-region SA1 changes in a plurality of steps so as to approach the first value Th31 as the target pixel nears the first object region OA1 and to approach the third value Th33 as the target pixel moves away from the first object region OA1, When the neighboring distance is 0, the large dot threshold Th3 is equivalent to the first value Th31. When the neighboring distance is the prescribed distance (L pixels), the large dot threshold Th3 is equivalent to the third value Th33. Therefore, the large dot threshold Th3 changes in a plurality of steps for pixels ranging from the first object region OA1 to the third object region OA3, thereby preventing any sudden changes in the large dot threshold Th3 between the first object region OA1 and the third object region OA3. This reduces the potential for noticeable borders at which the large dot threshold Th3 changes between the first object region OA1 and the third object region OA3. Specifically, this reduces the potential for abrupt changes in the density of large dots between the first object region OA1 and the third object region OA3.

The large dot threshold Th3 for the second target pixel Pi2 is set according to a similar process, That is, the large dot threshold Th3 for a target pixel in the second sub-region SA2 is varied in a plurality of steps so as to approach the second value Th32 as the target pixel nears the second object region OA2 and to approach the third value Th33 as the target pixel moves away from the second object region OA2, When the neighboring distance is 0, the large dot threshold Th3 is equivalent to the second value Th32. When the neighboring distance is the prescribed distance (L pixels), the large dot threshold Th3 is equivalent to the third value Th33.

Various values obtained using the thresholds Th31 and Th32 for the neighboring processed object regions OA1 and OA2 may be employed as the large dot threshold for a pixel in the third sub-region SA3. For example, the large dot threshold may be the average of a threshold calculated in the same way as a threshold for the first sub-region SA1 and a threshold calculated in the same way as a threshold calculated for the second sub-region SA2.

A large dot threshold is similarly set when a processed object region abuts the right edge or bottom edge of the target object region.

The parameter setting portion M120 sets a large dot threshold for each pixel in the target object region, as described above. The parameter setting portion M120 ends the process in FIG. 12 (S227 of FIG. 11) after setting a large dot threshold for all pixels.

When the type of the target object region is a "text image" (S215: NO in FIG. 11), in S235 the parameter setting portion M120 selects a standard large dot threshold to be used as the large dot threshold for the target object region. The standard large dot threshold is equivalent to the dot gradation value Vb3 for large dots, for example.

After the large dot threshold has been set for the target object region, the process returns to S210. When a large dot threshold has been set for all object regions (S210: YES), the process in FIG. 11 ends. The print data generation portion M125 executes the halftone process in S40 of FIG. 1 using the large dot thresholds set in the process of FIG. 11. The print data generation portion M125 uses the standard large dot threshold for the background region (the background region BA in FIG. 7(A), for example).

In this way, in the high image quality mode, a suitable large dot threshold Th3 is set for each object region, and the halftone process is performed on each object region using the large dot threshold Th3 set for that region. Accordingly, the control portion 100 can execute a halftone process on each object region that is suited to the potential for banding in that region, thereby appropriately suppressing banding even when the target image data includes a plurality of objects of various types.

Further, by executing the process on neighboring areas in the high image quality mode (S227 of FIG. 11), the control portion 100 can reduce the potential for noticeable borders between two abutting object regions where the large dot threshold changes. However, the process for neighboring areas may be omitted.

Note that large dot thresholds Th3 may be set for all object regions in S220a, S225, and S227, regardless of the types of the object regions.

A3. Selective High Image Quality Mode

Figure 13:
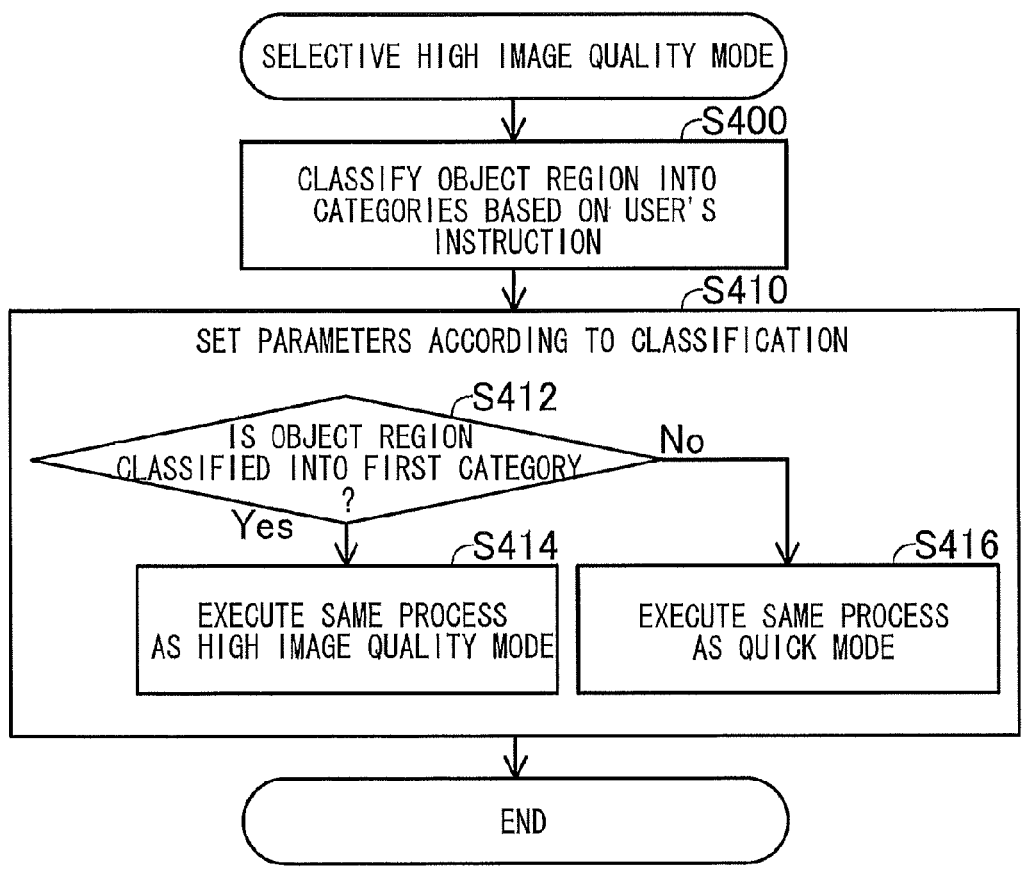
FIG. 13 is a flowchart illustrating steps in a selective high image quality mode process in S130 of FIG. 5.

FIG. 13 is a flowchart illustrating steps in the selective high image quality mode process in S130 of FIG. 5. In the selective high image quality mode, the control portion 100 sets object regions to be processed in the high image quality mode and object regions to be processed in the quick mode according to the user's instructions. In S400 of FIG. 13, the region classification portion M130 (see FIG. 1) sorts each object region into either a first category or a second category based on the user's instructions. The first category includes regions to be processed in the high image quality mode, while the second category includes regions to be processed in the quick mode.

Figure 14B:
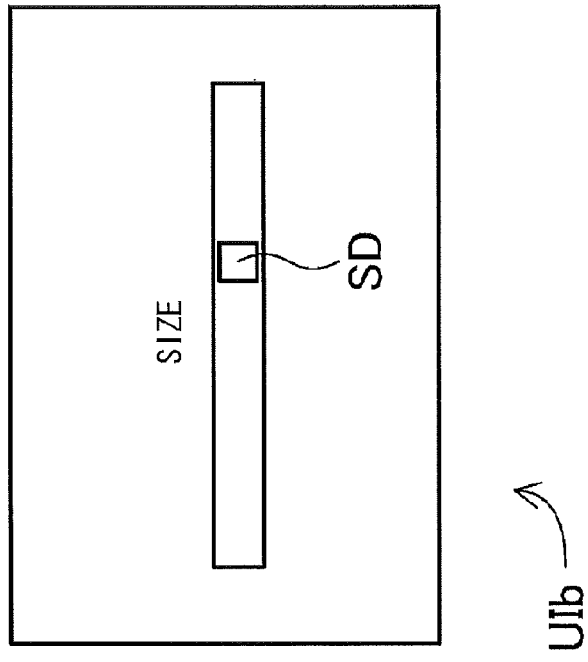
FIGS. 14(A) and 14(B) are explanatory diagrams showing examples of a display window.
Figure 14A:
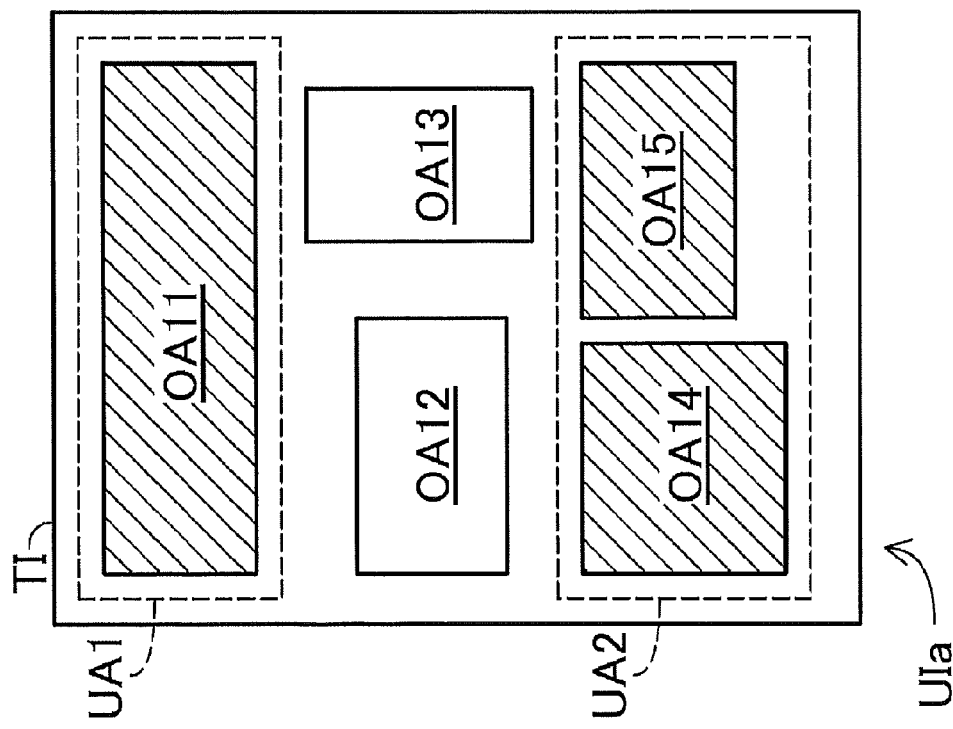

To achieve this, the region classification portion M130 displays a window on the display unit 180 prompting the user to input instructions. FIGS. 14(A) and 14(B) are explanatory diagrams showing an example of such a display window. FIG. 14(A) shows a display window UIa displaying all object regions detected in the target image TI. In the example of FIG. 14(A), five object regions OA11-OA15 have been detected, Selection frames UA1 and UA2 are also indicated in the display window UIa. By operating the operating unit 170, the user can move, reshape, add, or delete the selection frames. The region classification portion M130 classifies all object regions enclosed in selection frames in the first category and classifies all other object regions into the second category. Note that when using this display window UIa, the object region detection portion M110 detects the object regions in S400 of FIG. 13. Next, the region classification portion M130 uses the detection results to display the display window UIa on the display unit 180. By using the display window UIa in this way, the user can easily classify the objects.

The region classification portion M130 may display a window on the display unit 180 that is different from the display window UIa shown in FIG. 14(A). FIG. 14(B) is an explanatory diagram showing another example of a display window UIb. The display window UIb in FIG. 14(B) displays a slider SD for adjusting a threshold for the size of object regions (the total number of pixels, for example). The user can move the slider SD through operations on the display unit 180. The region classification portion M130 sorts object regions having a size greater than the threshold displayed by the slider SD into the first category, and sorts all remaining regions into the second category.

In S410 of FIG. 13, the parameter setting portion M120 sets parameters according to the classification results in S400. Specifically, in S414 the parameter setting portion M120 sets the large dot threshold Th3 according to the high image quality mode (FIG. 11) for object regions sorted into the first category (S412: YES) and in S416 sets the large dot threshold Th3 according to the quick mode (FIG. 6) for object regions sorted into the second category (S412: NO).

The process of FIG. 13 ends after the parameter setting portion M120 has set the large dot threshold Th3 for each object region as described above. The print data generation portion M125 executes the halftone process in S40 of FIG. 1 using the large dot thresholds Th3 set in FIG. 13. At this time, the print data generation portion M125 uses the standard large dot threshold for the background region (the background region BA in FIG. 7(A), for example).

By setting large dot thresholds Th3 in the high image quality mode for object regions of the first category sorted according to the user's instructions in the selective high image quality mode, the control portion 100 can perform a halftone process suited to the potential for banding in each object region according to the user's wishes. Further, a common large dot threshold Th3 configured according to the quick mode may be set for object regions sorted into the second category according to user instructions, thereby simplifying the process.

By setting the large dot threshold Th3 to a value that varies according to the banding estimation value BE in the first embodiment described above, the control portion 100 can execute halftone processes suited to the potential for banding, thereby suitably suppressing banding. Further, by selecting an operating mode according to the user's instructions, as described in FIG. 5 of the first embodiment, the control portion 100 can suppress banding according to the user's wishes.

B. Second Embodiment

FIG. 15 is a flowchart illustrating steps in a quick mode process according to a second embodiment of the present invention. The process in FIG. 15 may be executed in place of the process in FIG. 6. Unlike the process in FIG. 6, the standard large dot threshold is used in the process of FIG. 15 for object regions identified as text. The large dot threshold Th3 is set using the banding estimation value BE for object regions identified as either photos or drawings.

Steps in FIG. 15 that are identical to those in FIG. 6 have been designated with the same step numbers. Specifically, steps S200, S205, S210, S215, and S220 are identical to the same steps in FIG. 6. In the embodiment, S230 of FIG. 6 has been omitted. In other words, the process of setting the banding estimation value BE for object regions identified as text has been eliminated.

When the process in S215 and S220 has been performed on all object regions (S210: YES), the process advances to S240b. In S240b the average characteristic data calculation portion M116 calculates the total banding estimation value BE_T. In the embodiment, the total banding estimation value BE_T is the weighted average of banding estimation values BE for object regions identified as photos and drawings. Weighting is based on the size (area) of each object region.

In S245b the parameter setting portion M120 uses the total banding estimation value BE_T to set the large dot threshold Th3 for object regions identified as photos and drawings. The large dot threshold Th3 is set according to the same process in S245 of FIG. 6.

In S250b the parameter setting portion M120 sets the large dot threshold Th3 to be applied to other object regions (object regions identified as text and the background region BA) to the standard large dot threshold.

The process in FIG. 15 ends after the parameter setting portion M120 has set the large dot threshold Th3 as described above. The print data generation portion M125 then executes the halftone process in S40 of FIG. 1 using the large dot thresholds Th3 set in the process of FIG. 15.

In this way, the characteristic data setting portion M115 can set a banding estimation value BE for each object region of a specific type and not set a banding estimation value BE for other types of object regions. The average characteristic data calculation portion M116 can use the banding estimation value BE for the object regions of the specific type to calculate the total banding estimation value BE_T. The parameter setting portion M120 can use the total banding estimation value BE_T calculated by the average characteristic data calculation portion M116 to set a common large dot threshold Th3. The print data generation portion M125 can execute a halftone process on the specific type of object regions using the common large dot threshold Th3 set by the parameter setting portion M120. Here, the specific type of object regions is a type considered to have a higher potential for banding than the other types of object regions. For example, when the types of selections are "photo image," "drawing image," and "text image," at least one of the "photo image" and "drawing image" is used as the specific type. In this way, it is possible to execute a halftone process suited to object regions having high potential for banding. Note that the large dot threshold Th3 set using the banding estimation value BE for object regions of the specific type may be employed for object regions of all types. Further, the large dot threshold Th3 set from the banding estimation value BE for object regions of all types may be applied to object regions of all types, as in the first embodiment described with reference to FIG. 6.

C. Variations of the Embodiments (1) The embodiments describe various methods of detecting object regions. For example, uniform regions with little change in color are treated as the background region, and the remaining regions are treated as object regions. Further, the object regions may have shapes other than a rectangular shape.

(2) Any of various methods may be employed to identify types of object regions in the embodiments and variations thereof in addition to the method described in FIGS. 7(b) and 7(c). For example, text images may be identified using text pattern matching.

(3) In the embodiments, the halftone process is implemented using an error diffusion method. However, the halftone process in the method of the present invention is not limited to error diffusion, but may be any of a variety of processes known in the art, such as a process employing dither matrices. For example, when treating the four dot formation states of "large dot," "medium dot," "small dot," and "no dot," the halftone process may be implemented using a dither matrix for large dots, a dither matrix for medium dots, and a dither matrix for small dots. Assuming that the original gradation values have a possible 256 levels from 0 to 255, the presence of a small dot may be determined by comparing the original gradation value with the small dot dither matrix when the original gradation value is within the range 0-84. The presence of a medium dot may be determined by comparing the original gradation value with the medium dot dither matrix when the original gradation value is within the range 85-170, The presence of a large dot may be determined by comparing the original gradation value with the large dot dither matrix when the original gradation value is within the range 171-255. This method can be used to implement a suitable halftone process.

When a halftone process is performed using a dither matrix, either the banding estimation value BE or the total banding estimation value BE_T may be used to set the dither matrix. When there is a high potential for banding, the threshold values in the large dot dither matrix may be reduced, and the threshold values in the small dot and medium dot dither matrices may be increased. When there is a low probability of banding, the threshold values in the large dot dither matrix may be increased, while the threshold values in the small dot and medium dot dither matrices are reduced.

(4) While there are four dot formation states in the embodiments, including a "large dot," "medium dot," "small dot," and "no dot," various states may be employed. Generally, the dot formation states are a plurality of states that include a no-dot state, a state in which a first dot having a size similar to the medium dot dtM described in FIG. 4(A) is formed, and a state in which a second dot having a size similar to the large dot dtL described in FIG. 4(B) is formed. For example, the dot formation states may include a dot that is larger than the second dot (the large dot dtL), In any case, the potential for banding can be reduced by increasing the number of second dots per unit area when the potential for banding represented by the banding estimation value BE or total banding estimation value BE_T is high. In addition, the quality of graininess can be improved by reducing the number of second dots per unit area and increasing the number of dots that are smaller than the second dots when there is a low probability of banding represented by the banding estimation value BE or total banding estimation value BE_T.

(5) In the embodiments described above and their variations, the target image data used in the parameter setting process (S90 in FIG. 1) is not limited to bitmap data generated through rasterization, but may be any of various image data to be printed. For example, the input image data may be used as the target image data. Alternatively, CMYK image data obtained through the color conversion process or calibration process may be employed as the target image data.

(6) The control portion 100 may be provided with only some of the modes described in the embodiments from among the quick mode, the high image quality mode, and the selective high image quality mode. The mode selection portion M135 may be eliminated when the control portion 100 is provided with only one mode.

(7) The control portion 100 in the embodiments is an example of the image processor according to the present invention. The control portion 100 and the printing unit 200 in the embodiments may be configured as independent devices provided separately.

(8) Part of the configuration implemented in hardware in the embodiments may be replaced with software and, conversely, all or part of the configuration implemented in software in the embodiments may be replaced with hardware. For example, the function of the print data generation portion M125 in FIG. 1 may be implemented by dedicated hardware configured of logic circuits.

When all or part of the functions of the present invention are implemented in software, the software (i.e., computer programs) can be stored on a computer-readable storage medium (a non-temporary storage medium, for example). The "computer-readable storage medium" may be a portable medium, such as a memory card or CD-ROM; an internal storage device built into the computer, such as any of various ROM and the like; or an external storage device, such as a hard disk drive, connected to the computer.

While the invention has been described in detail with reference to the embodiments thereof, it would be apparent to those skilled in the art that various changes and modifications may be made therein without departing from the scope of the invention.

What is claimed is:

1. An image processing device comprising a processor configured to perform:
  (a) acquiring target image data representing an image including a plurality of pixels, the target image data including a plurality of sets of pixel data corresponding to the plurality of pixels, the image including an object having at least one pixel of the plurality of pixels;
  (b) detecting the object in the image based on the target image data;
  (c) determining characteristic data indicating a potential for an occurrence of banding in the object based on the target image data;
  (d) determining a parameter based on the characteristic data; and
  (e) executing a halftone process to determine, for each of the plurality of pixels, a dot to be formed based on the corresponding set of pixel data by using the parameter.

2. The image processing device according to claim 1, wherein the determining (c) determines the characteristic data based on at least one of a size of the object, a color number of colors included in the object, and a saturation determined by at least one set of pixel data corresponding to the at least one pixel.

3. The image processing device according to claim 1, wherein the image includes a plurality of objects, each of the plurality of objects including at least one pixel of the plurality of pixels,
  wherein the detecting (b) detects the plurality of objects based on the target image data,
  wherein the determining (c) determines, as the characteristic data, a plurality of characteristic values for the plurality of objects,
  the processor further configured to perform:
  (f) identifying a type of each of the plurality of objects from among a plurality of types including a specific type;
  (g) calculating average characteristic data by weighted averaging the plurality of characteristic values by a plurality of weight factors, the plurality of weight factors corresponding to the plurality of characteristic values and the plurality of objects, each of the plurality of weight factors defined by a size of the corresponding object,
  wherein the determining (d) determines the parameter by using the average characteristic data, wherein the executing (e) includes (e-1) executing a first halftone process to determine the dot to be formed by using the parameter for the at least one pixel in each object identified as the specific type.

4. The image processing device according to claim 1, wherein the image including a plurality of objects, each of the plurality of objects including at least one pixel of the plurality of pixels,
- wherein the detecting (b) detects the plurality of objects based on the target image data,
- wherein the determining (c) determines a plurality of sets of characteristic data for the plurality of objects,
- wherein the determining (d) determines a parameter for each object of the plurality of objects by using the set of characteristic data corresponding to the each object,
- wherein the executing (e) includes (e-2) executing a second halftone process to determine, for the at least one pixel in each object of the plurality of objects, the dot to be formed by using the parameter corresponding to the each object.

5. The image processing device according to claim 4, wherein the plurality of objects includes a first object and a second object contacting to the first object,
- wherein the determining (d) determines a first parameter for the first object and a second parameter for the second object,
- wherein the determining (d) further determines, based on the second parameter, a plurality of step parameters corresponding to pixels in a part of the second object such that the step parameter approaches the first parameter as the pixel corresponding to the step parameter nears the first object and approaches the second parameter as the pixel corresponding to the step parameter moves away from the first object,
- wherein the executing (e-2) executes the second halftone process for the pixels in the part of the second object by using the respective step parameters.

6. The image processing device according to claim 1, wherein the image includes a plurality of objects, each of the plurality of objects including at least one pixel of the plurality of pixels,
- wherein the detecting (b) detects the plurality of objects based on the target image data,
- wherein the determining (c) determines a plurality of sets of characteristic data for the plurality of objects,
- the processor further configured to perform (h) classifying, based on a user's instruction, each of the plurality of objects into one of a plurality of categories including a first category and a second category,
- wherein the determining (d) includes:
  - (d-1) determining a parameter for each object classified into the first category by using the corresponding set of characteristic data; and
  - (d-2) determining a same parameter for all objects classified into the second category,
- wherein the executing (e) includes:
  - (e-3) executing a third halftone process to determine the dot by using the respective parameter for the at least one pixel in the each object classified into the first category; and
  - (e-4) executing a fourth halftone process to determine the dot by using the common parameter for the at least one pixel in the each object classified into the second category.

7. The image processing device according to claim 1, the processor further configured to perform (i) selecting one mode of a plurality of modes,
- wherein the determining (c) determines the characteristic data in different methods according to the selected one mode,
- wherein the determining (d) determines the parameter in different methods according to the selected one mode,
- wherein the executing (e) executes the halftone process in different methods according to the selected one mode.

8. The image processing device according to claim 1, wherein the halftone process determines, for each of the plurality of pixels, whether the dot is formed, and determines, as a size of the dot, one of a first size and a second size by using the parameter when the halftone process determines that dot is formed, the second size larger than the first size,
- wherein the halftone process uses the parameter to determine a dot number of second dots in a unit area,
- wherein the determining (d) determines the parameter such that the dot number of second dots increases as the potential for an occurrence of banding becomes high.

9. The image processing device according to claim 8, wherein the executing (e) includes:
- (e-5) selecting a target pixel among the plurality of pixels, the plurality of pixels including a peripheral pixel positioned on a periphery of the target pixels;
- (e-6) obtaining an error value of the peripheral pixel and a weight factor corresponding to the peripheral pixel; and
- (e-7) determining the dot to be formed for the target pixel and an error value of the target pixel, by using the error value of the peripheral pixel, the weight factor, and the parameter as a threshold value to determine the size of the dot.

10. A non-transitory computer-readable storage medium storing computer-readable instructions that, when executed by a processor, causes an image processing device to perform:
- (a) acquiring target image data representing an image including a plurality of pixels, the target image data including a plurality of sets of pixel data corresponding to the plurality of pixels, the image including an object having at least one pixel of the plurality of pixels;
- (b) detecting the object in the image based on the target image data;
- (c) determining characteristic data indicating a potential for an occurrence of banding in the object based on the target image data;
- (d) determining a parameter based on the characteristic data; and
- (e) executing a halftone process to determine, for each of the plurality of pixels, a dot to be formed based on the corresponding set of pixel data by using the parameter.

* * * * *